(12) United States Patent
Asao et al.

(10) Patent No.: US 6,657,331 B2
(45) Date of Patent: Dec. 2, 2003

(54) AUTOMOTIVE ALTERNATOR

(75) Inventors: Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/838,252

(22) Filed: Apr. 20, 2001

(65) Prior Publication Data

US 2002/0043881 A1 Apr. 18, 2002

(30) Foreign Application Priority Data

Oct. 17, 2000 (JP) ........................................ 2000-316515

(51) Int. Cl.[7] ................................................. H02K 9/00
(52) U.S. Cl. ............................ 310/54; 310/52; 310/64; 310/260; 310/45
(58) Field of Search ............................ 310/54, 52, 64, 310/44, 45, 42, 201, 180, 208, 254, 260

(56) References Cited

U.S. PATENT DOCUMENTS

| 4,739,204 A | * | 4/1988 | Kitamura et al. ......... 310/68 D |
| 4,922,148 A | | 5/1990 | Kitamura |
| 5,708,316 A | * | 1/1998 | Ishida ........................ 310/184 |
| 5,798,586 A | * | 8/1998 | Adachi ........................ 310/54 |
| 6,049,154 A | * | 4/2000 | Asao et al. ................. 310/201 |

FOREIGN PATENT DOCUMENTS

| EP | 10-37361 | 9/2000 | |
| JP | 5-16261 | 3/1993 | ............ H02K/9/19 |
| JP | 2842500 | 10/1998 | ............ H02K/9/19 |
| JP | 2000-1225512 | 4/2000 | |
| KR | 1998-086538 A | 12/1998 | |

OTHER PUBLICATIONS

Abstract US4818906 Oct. 21, 1994.
Abstract JP6296348 Oct. 21, 1994.

* cited by examiner

Primary Examiner—Thanh Lam
(74) Attorney, Agent, or Firm—Sughrue Mion, PLLC

(57) ABSTRACT

Circumferentially-smooth heat-conducting surfaces are formed on coil ends by rolling a coil end group of a stator winding. A distribution channel for distributing cooling water is disposed in a bracket. A heat-conducting filler is filled between the coil end group and the bracket.

12 Claims, 17 Drawing Sheets

1

AUTOMOTIVE ALTERNATOR

This application is based on Application No. 2000-316515, filed in Japan on Oct. 17, 2000, the contents of which are hereby incorporated by reference.

BACKGROUND OF THE INVENTION

1. Field of the Invention

The present invention relates to an automotive alternator in which a heat-generating portion is cooled by a liquid coolant.

2. Description of the Related Art

Heat-generating parts such as a rotor winding, a stator winding, a rectifier, and a voltage regulator are mounted in automotive alternators, and to achieve high performance, it is important to suppress temperature increases in the stator winding by efficiently dissipating heat generated, particularly in the stator winding, which is the largest heat-generating part.

It has been proposed conventionally, in Japanese Patent Examined Publication No. HEI 5-16261, for example, that temperature increases in a stator winding in an automotive alternator be suppressed by constructing a distribution channel for a liquid coolant such as water, etc., inside a bracket, filling an electrically-insulating filler composed of a synthetic resin, etc., between a coil end group of the stator winding and the bracket, transferring heat generated in the stator winding to the bracket by means of the electrically-insulating filler, and allowing the heat to be absorbed by the liquid coolant flowing through the distribution channel inside the bracket.

It has also been proposed in Japanese Patent No. 2842500, for example, that temperature increases in a stator winding be suppressed by embedding a tube inside a bracket, the tube constituting a distribution channel for a liquid coolant such as water, etc., extending a portion of the tube out from the bracket, placing the tube in close contact with a coil end group of the stator winding, and allowing heat generated in the stator winding to be absorbed by the liquid coolant flowing through the inside of the tube.

Now the construction of a conventional stator will be explained with reference to FIG. 23.

As shown in FIG. 23, a stator 100 is constituted by a cylindrical stator core 101 composed of a laminated core formed with slots 101a extending axially at a predetermined pitch in a circumferential direction, and a stator winding 102 installed in the stator core 101.

The stator winding 102 is composed of three stator winding phase portions. Each of the stator winding phase portions is manufactured into a generally cylindrical winding assembly by winding one strand of slender copper wire a predetermined number of times into a wave winding at a pitch of three slots, the slender copper wire having a circular cross section coated with electrical insulation. These three winding assemblies are offset from each other at a pitch of one slot in a circumferential direction, and are stacked radially in three layers. Then, the stator 100 is manufactured by reducing the diameter of the three winding assemblies, inserting the three winding assemblies into the stator core 101, and then pressing the three winding assemblies into the slots 101a from a slot opening side.

In the conventional stator 100 manufactured in this manner, because the winding assemblies constituting the stator winding 102 are reduced in diameter and inserted into the stator core 101, and in addition are pressed into the slots 101a from the slot opening side, coil ends composed of bundles of the slender copper wires led out from first slots 110a and led into second slots 110a three slots away are deformed, and in addition the coil ends overlap radially at outlet portions where the coil ends are led out of the slots 110a (or inlet portions where the coil ends are led into the slots). As a result, outer circumferential surfaces of coil end groups of the stator winding 102 have large irregularities in a circumferential direction. Because the positions of the slender copper wires in the coil ends are not specified, large irregularities occur on surfaces of the coil ends. In addition, because the coil ends are formed into bundles of slender copper wires, the slender copper wires are not in close contact with each other in the coil ends, making thermal conductivity in the coil ends poor.

When the cooling construction proposed in Japanese Patent Examined Publication No. HEI 5-16261 is adopted in an automotive alternator mounted with the stator 100 constructed in this manner, the outer circumferential surfaces of the coil end groups and the electrically-insulating filler are in partial contact. Because the outer circumferential surfaces of the coil end groups have irregularities in a circumferential direction, and in addition, the surfaces of the coil ends have irregularities, heat generated in the stator winding 102 is mainly transferred to the electrically-insulating filler via two heat transfer pathways which are directly from the slender copper wires in the coil ends and by means of air in gaps between the slender copper wires and the electrically-insulating filler, and is additionally transferred to the bracket and absorbed by the liquid coolant, cooling the stator 100.

When the cooling construction proposed in Japanese Patent No. 2842500 is adopted in an automotive alternator mounted with this stator 100, the outer circumferential surfaces of the coil end groups and the tube are in partial contact. Because the outer circumferential surfaces of the coil end group have irregularities in a circumferential direction, and in addition the surfaces of the coil ends have irregularities, heat generated in the stator winding 102 is mainly transferred to the tube via two heat transfer pathways which are directly from the slender copper wires in the coil ends and by means of air in gaps between the slender copper wires and the tube, and is absorbed by the liquid coolant, cooling the stator 100.

In conventional automotive alternators, because the outer circumferential surfaces of the coil end groups of the stator winding 102 have large irregularities, and in addition the surfaces of the coil ends have large irregularities, one problem has been that thermal contact between the slender copper wires which constitute the coil end groups and the electrically-insulating filler or the tube is insufficient when the cooling constructions proposed in Japanese Patent Examined Publication No. HEI 5-16261 or Japanese Patent No. 2842500 are adopted, and therefore sufficient cooling cannot be achieved. In addition, because the slender copper wires are not in close contact with each other in the coil ends, another problem has been that thermal conductivity in the coil ends is poor and a sufficient cooling effect cannot be achieved.

SUMMARY OF THE INVENTION

The present invention aims to solve the above problems and an object of the present invention is to provide an automotive alternator enabling temperature increases in a stator to be suppressed by constituting a predetermined region of outer surfaces of coil ends in a radial direction of a stator core facing radially outwards from the stator core and extending from a vicinity of the end surface of the stator core to apex portions into a circumferentially-smooth heat-conducting surface to raise thermal contact between the coil ends and a heat-conducting filler or between the coil ends and a tube and to achieve a superior cooling effect.

In order to achieve the above object, according to one aspect of the present invention, there is provided an automotive alternator including:

a stator having a stator core formed with slots extending axially at a predetermined pitch in a circumferential direction and a stator winding installed in the stator core;

a rotor rotatably disposed on an inner circumferential side of the stator; and a bracket for supporting the stator and the rotor, wherein a coil end group of the stator winding is constructed such that coil ends folded back outside the slots at an end surface of the stator core are arranged circumferentially, wherein a predetermined region of outer surfaces of the coil ends in a radial direction of the stator core constitutes a circumferentially-smooth heat-conducting surface, the outer surfaces facing radially outwards from the stator core and extending from a vicinity of the end surface of the stator core to apex portions of the coil ends, and wherein a distribution channel for a liquid coolant is disposed for absorbing heat generated in the stator and conducted from the heat-conducting surface.

The distribution channel may be formed inside the bracket, a thermally-conductive resin being filled between the coil end group and the bracket in a state of general contact with the heat-conducting surface.

The distribution channel may be constituted by a tube composed of a thermally-conductive material, a portion of the tube being disposed in a state of general contact with the heat-conducting surface of the coil end group.

The stator winding may be provided with a plurality of winding sub-portions each constructed by installing a strand of wire at intervals of a predetermined number of slots so as to alternately occupy an inner layer and an outer layer in a slot depth direction within the slots, turn portions of the strands of wire which are folded back outside the slots at the end surface of the stator core forming the coil ends and lining up generally uniformly in a circumferential direction to constitute the coil end group.

The turn portions may be disposed circumferentially so as to line up in a plurality of rows radially, radially-adjacent turn portions being in general contact with each other.

The strand of wire may be formed with a rectangular cross-sectional shape, the heat-conducting surface being constituted by a flat side surface of the strand of wire.

The turn portions may be disposed circumferentially such that intermediate portions of the turn portions are in close proximity with each other, the intermediate portions being between portions where the turn portions extend out from the slots and portions where the turn portions are folded back.

A resin may be filled between the turn portions such that a surface of the resin is positioned in a common plane with a surface of the strand of wire, the heat-conducting surface being constituted by a smooth surface composed of the surface of the strand of wire and the surface of the resin.

The strand of wire may be a continuous wire.

DETAILED DESCRIPTION OF THE PREFERRED EMBODIMENTS

The preferred embodiments of the present invention will now be explained with reference to the drawings.

Embodiment 1

Figure 1:
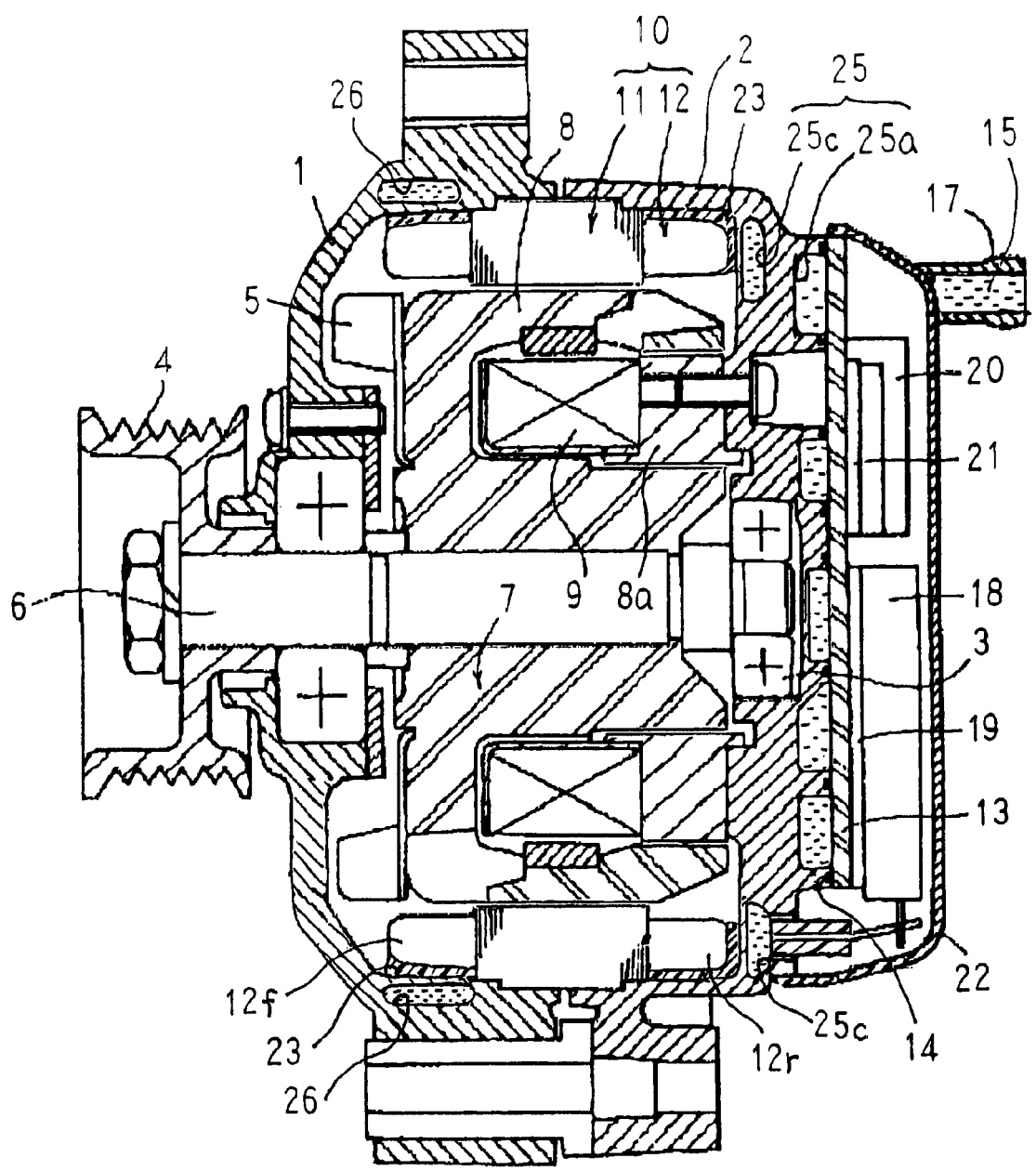
FIG. 1 is a longitudinal section of an automotive alternator according to Embodiment 1 of the present invention.
Figure 2:
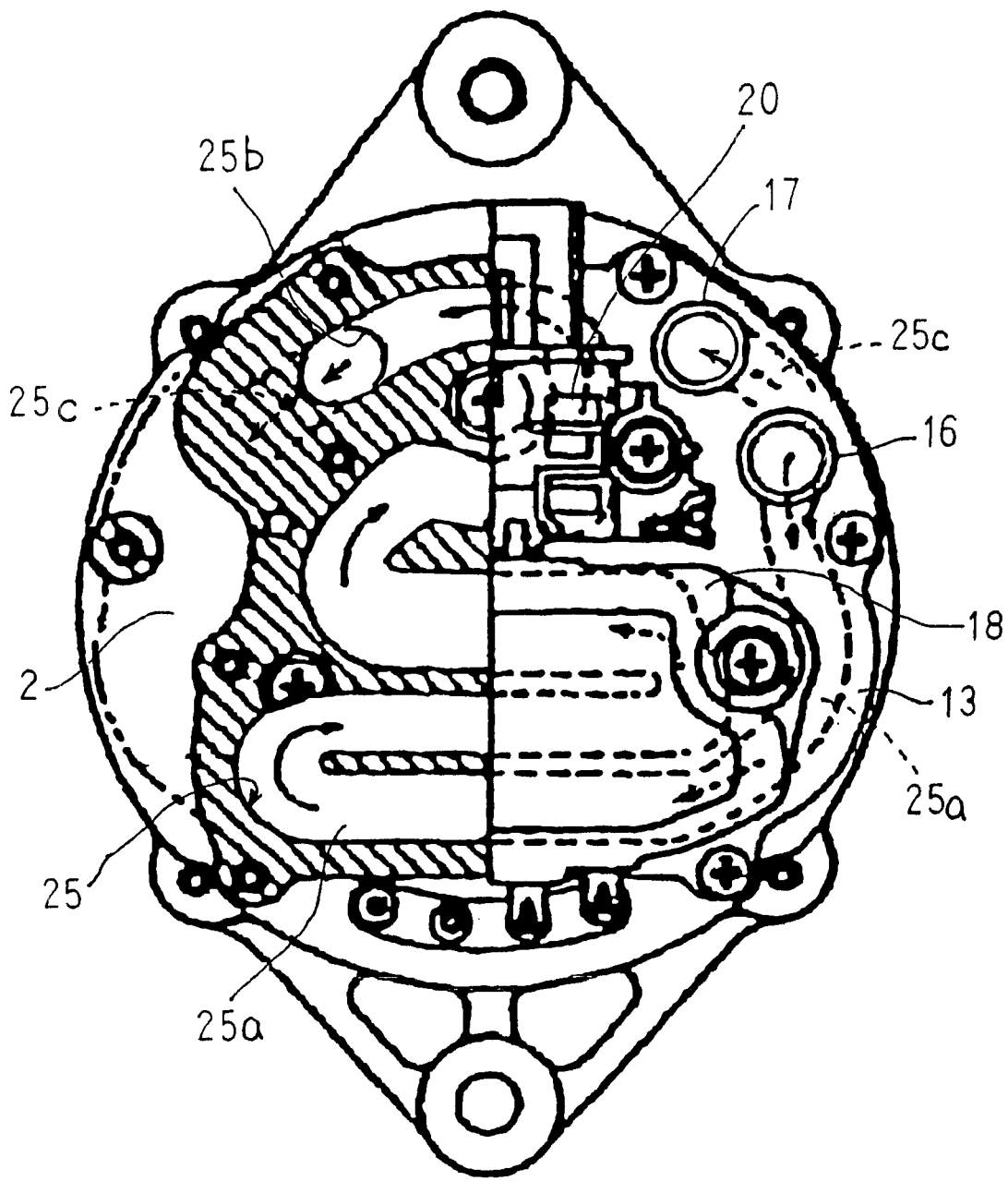
FIG. 2 is a partial cutaway elevation of the automotive alternator according to Embodiment 1 of the present invention viewed from a rear end.

FIG. 1 is a longitudinal section of an automotive alternator according to Embodiment 1 of the present invention, and FIG. 2 is a partial cutaway elevation of the automotive alternator shown in FIG. 1 viewed from a rear end.

In FIGS. 1 and 2, a shaft 6 is rotatably supported in an aluminum front bracket 1 and an aluminum rear bracket 2 by means of front-end and rear-end bearings 3. A pulley 4 is fastened to a front end of this shaft 6 such that rotational torque from an engine can be transmitted to the shaft 6 by means of a belt (not shown).

A rotor 7 is constituted by a magnetic pole core 8 fastened to the shaft 6, a stationary magnetic pole core 8a fastened to the rear bracket 2, and an excitation winding 9 held by the stationary magnetic pole core 8a. A fan 5 for air agitation inside the brackets 1 and 2 is fastened to a front end surface of the magnetic pole core 8. A stator 10 is constituted by a cylindrical stator core 11 and a stator winding 12 installed in the stator core 11, the stator 10 being fastened to the front bracket 1 and the rear bracket 2 so as to surround an outer circumferential side of the rotor 7. An aluminum bracket cover 13 is attached to the rear bracket 2, and a rear-end distribution channel 25 which is recessed into the rear bracket 2 is kept fluid-tight by means of a seal 14. An inflow pipe 16 and an outflow pipe 17 are disposed in the rear bracket 2 so as to be linked to the rear-end distribution channel 25. This rear-end distribution channel 25 is constituted by: a first rear-end distribution channel portion 25a disposed in the bracket cover 13 side of the rear bracket 2, a first end of the first rear-end distribution channel portion 25a being linked to the inflow pipe 16; and a second rear-end distribution channel portion 25c disposed in an annular shape in the rotor 7 side of the rear bracket 2 so as to be disposed opposite apex portions of a rear-end coil end group 12r, a first end of the second rear-end distribution channel portion 25c communicating with a second end of the first rear-end distribution channel portion 25a through a communicating aperture 25b and a second end of the second rear-end distribution channel portion 25c being linked to the outflow pipe 17. A front-end distribution channel 26 is disposed in an annular shape in the front bracket 1 so as to surround a front-end coil end group 12f of the stator winding 12 in a circumferential direction, first and second ends of this front-end distribution channel 26 being linked to the first and second ends of the second rear-end distribution channel portion 25c by a communicating pipe (not shown).

A rectifier 18 is fastened to the bracket cover 13 through a rectifier heat sink 19, and a voltage regulator 20 is fastened to the bracket cover 13 through a regulator heat sink 21. A protective cover 22 is attached to the rear bracket 2 so as to cover the rectifier 18 and the voltage regulator 20. In addition, a heat-conducting filler 23 composed of a thermally-conductive resin such as a silicone resin, for example, is filled in between the front-end coil end group 12f of the stator winding 12 and the front bracket 1, and between the rear-end coil end group 12r and the rear bracket 2.

Figure 3:
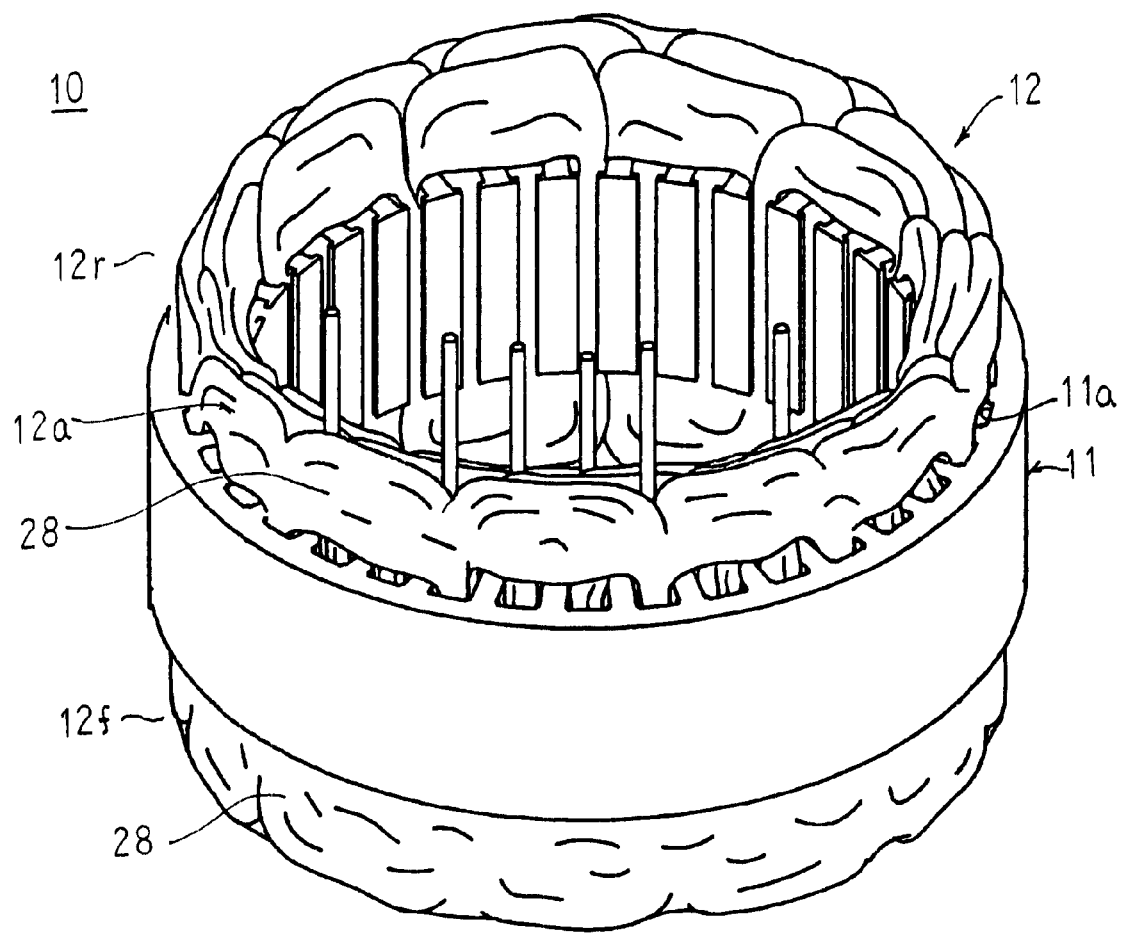
FIG. 3 is a perspective of a stator used in the automotive alternator according to Embodiment 1 of the present invention.

As shown in FIG. 3, the stator 10 is constituted by the cylindrical stator core 11, which is composed of a laminated core formed with slots 11a extending axially at a predetermined pitch in a circumferential direction, and the stator winding 12 which is installed in the stator core 11. The coil end groups 12f and 12r of the stator winding 12 are constructed by arranging coil ends 12a in rows circumferentially, the coil ends 12a extending out from first slots 11a, folding over at end surfaces of the stator core 11, and entering second slots 11a a predetermined number of slots away. Outer circumferential surfaces of the coil ends 12a form circumferentially-smooth heat-conducting surfaces 28.

Figure 4:
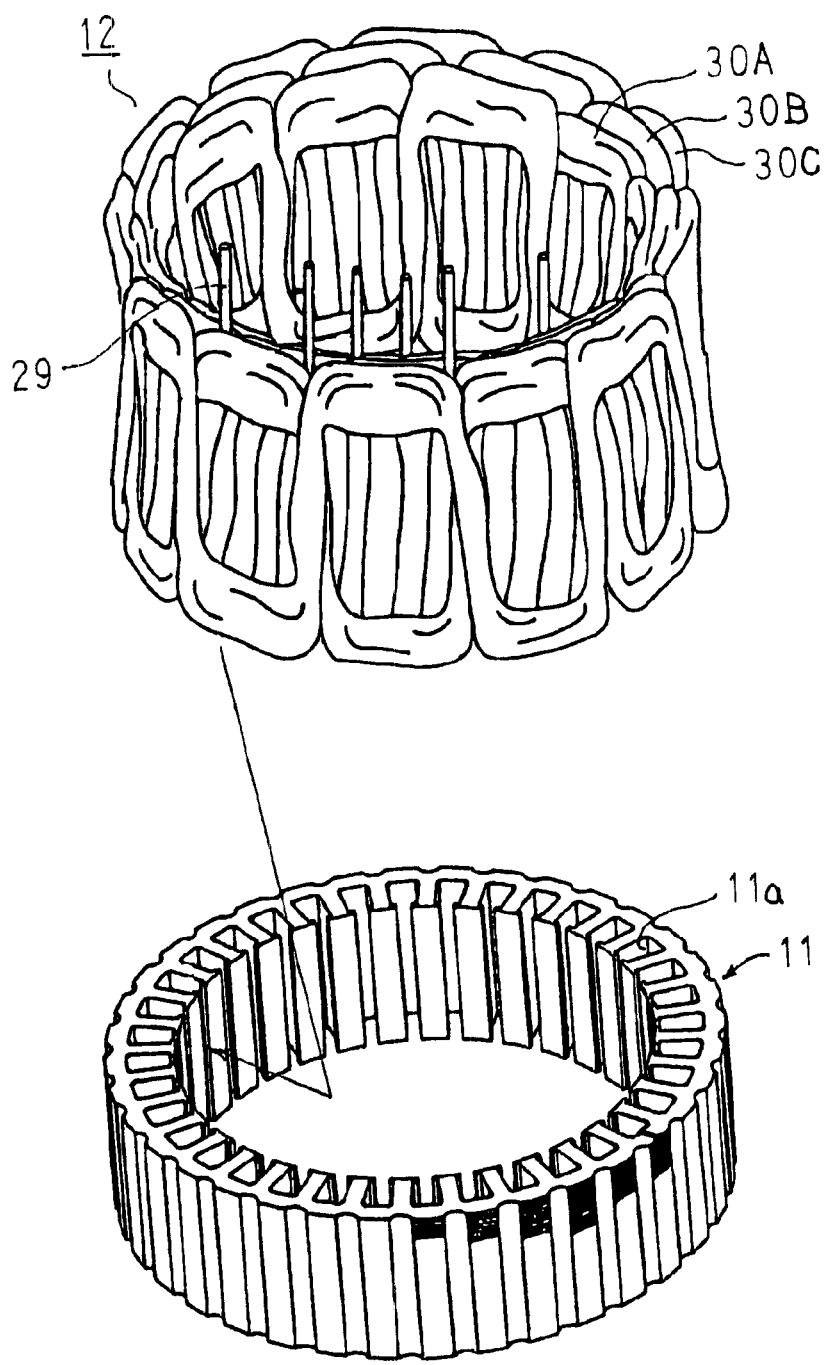
FIG. 4 is a diagram explaining a method of manufacture for the stator used in the automotive alternator according to Embodiment 1 of the present invention.

The procedure for manufacturing the stator 10 will be explained here with reference to FIGS. 4 to 6. Moreover, slender copper wires 29 having a circular cross section coated with electrical insulation are used as strands of wire.

First, a generally cylindrical first winding assembly 30A is manufactured by winding one strand of the slender copper wires 29 a predetermined number of times into a wave winding at a pitch of three slots. Second and third winding assemblies 30B and 30C are similarly manufactured. The three winding assemblies 30A, 30B, and 30C are offset from each other at a pitch of one slot in a circumferential direction, and are stacked radially in three layers. Then, as shown in FIG. 4, a stator 10a is manufactured by reducing the diameter of the three winding assemblies 30A, 30B, and 30C, inserting the three winding assemblies 30A, 30B, and 30C into the stator core 11, and then pressing the three winding assemblies 30A, 30B, and 30C into the slots 11a from a slot opening side. Moreover, although not shown, an insulator is mounted inside each of the slots 11a, ensuring electrical insulation between the stator core 11 and the stator winding 12.

Figure 5:
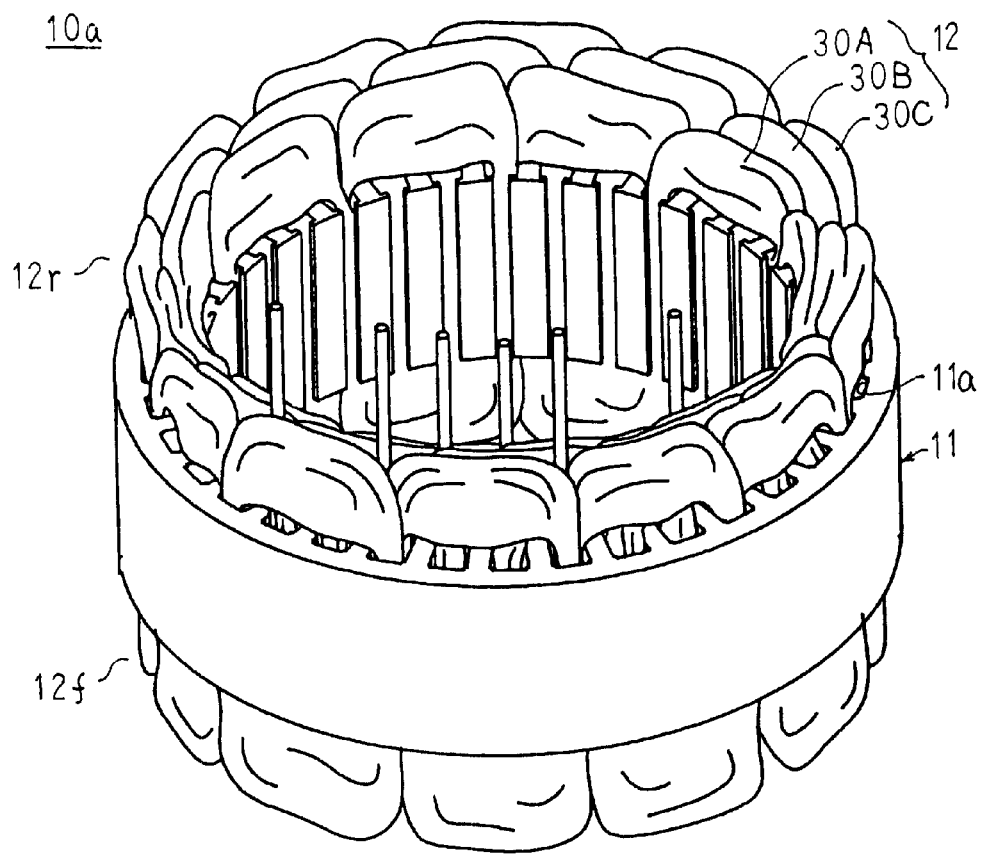
FIG. 5 is a perspective showing the state of the stator used in the automotive alternator according to Embodiment 1 of the present invention before rolling.
Figure 23:
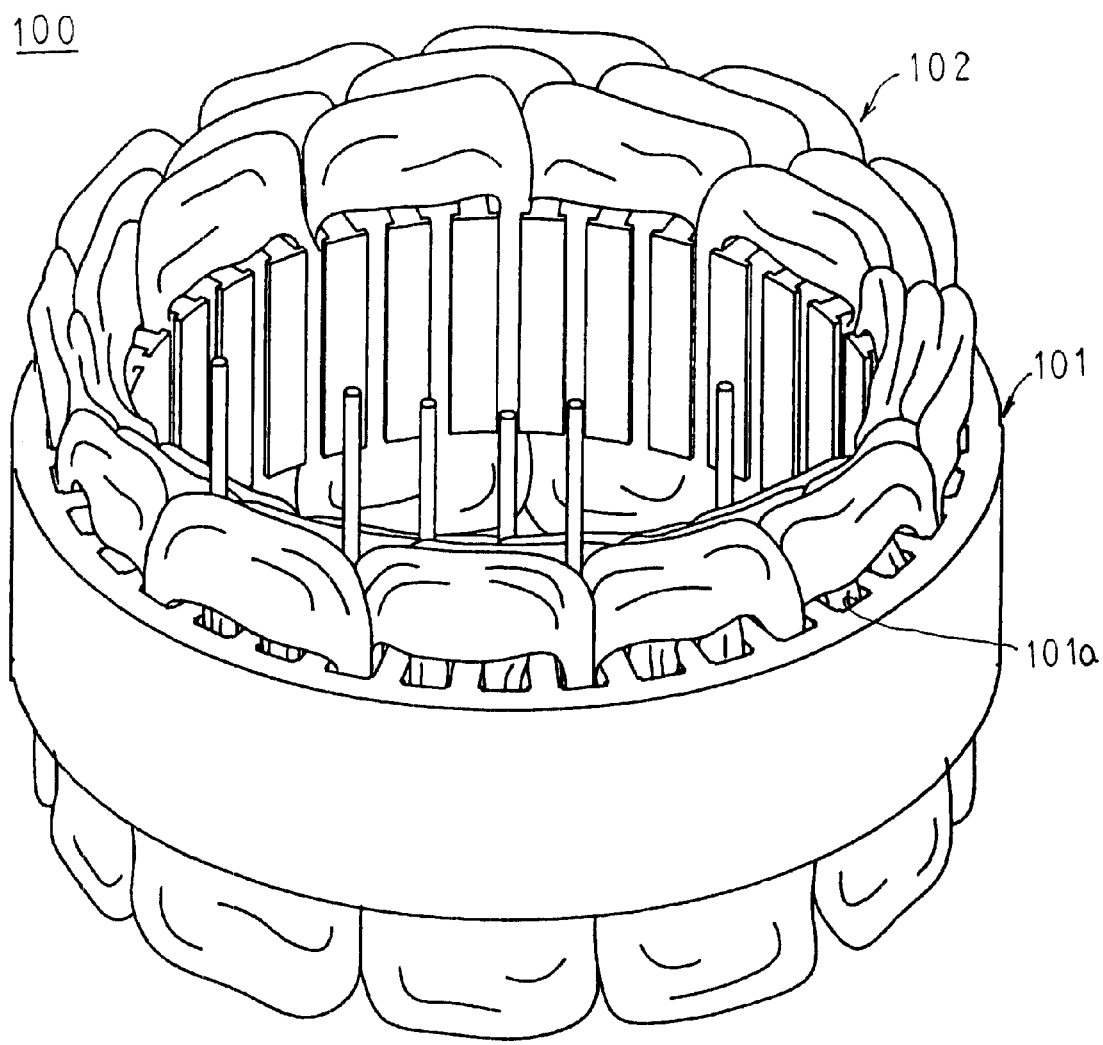
FIG. 23 is a perspective of a stator used in a conventional automotive alternator.

As shown in FIG. 5, in the stator winding 12 of the stator 10a manufactured in this manner, the coil ends 12a, which are composed of bundles of the slender copper wires 29 led out from first slots 11a and led into second slots 11a three slots away, are deformed, and in addition the coil ends 12a overlap radially at outlet portions where the coil ends 12a are led out of the slots 11a (or inlet portions where the coil ends 12a are led into the slots 11a). As a result, outer circumferential surfaces of the coil end groups 12f and 12r of the stator winding 12 have large irregularities in a circumferential direction, in a similar manner to the conventional stator 100 shown in FIG. 23. Because the positions of the slender copper wires 29 are not specified in the coil ends 12a, large irregularities occur on surfaces of the coil ends 12a. In addition, because the slender copper wires 11 29 are not in close contact with each other in the coil ends 12a, thermal conductivity in the coil ends 12a is poor.

Figure 6:
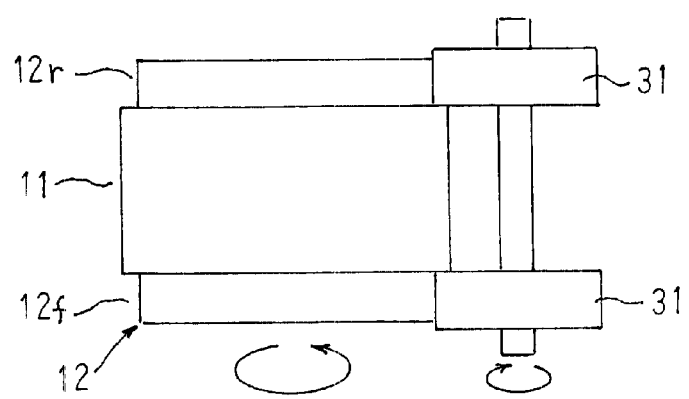
FIG. 6 is a diagram explaining the rolling of the stator used in the automotive alternator according to Embodiment 1 of the present invention.

Next, as shown in FIG. 6, the coil end groups 12f and 12r are rolled by rotating rollers 31 while pressing the rollers 31 against the coil end groups 12r and 12f from a radially outer side. Thus, in a region where outer circumferential surfaces of the coil end groups 12f and 12r come into contact with the rollers 31, circumferential irregularities are flattened by the rollers 31 to obtain the stator 10 shown in FIG. 3. In this stator 10, outer surfaces of the bundles of the slender copper wires 29 constituting the coil ends 12a are reshaped uniformly in a circumferential direction, and in addition the outer circumferential surfaces of the coil end groups 12f and 12r are reshaped uniformly in a circumferential direction. The outer surfaces of the coil ends 12a reshaped uniformly in a circumferential direction constitute the smooth heat-conducting surfaces 28. In addition, irregularities between the coil ends 12a are eliminated on the outer circumferential surfaces of the coil end groups 12f and 12r, forming circumferentially-smooth surfaces (the heat-conducting surfaces).

Thus, the heat-conducting filler 23 filled in between the front-end coil end group 12f and the front bracket 1 and between the rear-end coil end group 12r and the rear bracket 2 comes into close contact with the heat-conducting surfaces 28 of the coil ends 12a, ensuring sufficient thermal contact. By rolling the coil end groups 12f and 12r, the slender copper wires 29 inside the coil ends 12a come into close contact with each other, increasing thermal conductivity inside the coil ends 12a.

Next, a cooling action in the automotive alternator constructed in this manner will be explained.

Rotational torque from an automotive engine is transmitted to the shaft 6 through the belt and the pulley 4, rotating the fan 5 and agitating air inside the front bracket 1 and the rear bracket 2. Cooling water 15 functioning as a liquid coolant flows into the rear-end distribution channel 25 through the inflow pipe 16, and, as indicated by the arrows in FIG. 2, flows through the inside of the first rear-end distribution channel portion 25a, then flows into the second rear-end distribution channel portion 25c through the communicating aperture 25b, flows through the inside of the second rear-end distribution channel portion 25c, then flows out through the outflow pipe 17. A portion of the cooling water 15 which flowed into the second rear-end distribution channel portion 25c flows into the front-end distribution channel 26 through the communicating pipe, flows through the inside of the front-end distribution channel 26, then flows into the second rear-end distribution channel portion 25c through the communicating pipe, merges with the cooling water 15 which flowed through the inside of the second rear-end distribution channel portion 25c, and flows out through the outflow pipe 17.

Now, heat generated in the rectifier 18 and the voltage regulator 20 is transferred to the bracket cover 13 through the heat sinks 19 and 21, respectively, and is absorbed into the cooling water 15 flowing through the inside of the first rear-end distribution channel portion 25a. Heat generated in the rear-end bearing 3 is transferred to the rear bracket 2 and is absorbed into the cooling water 15 flowing through the inside of the first rear-end distribution channel portion 25a. Heat generated in the front-end bearing 3 is transferred to the front bracket 1 and is absorbed into the cooling water 15 flowing through the inside of the front-end distribution channel 26. In addition, heat generated in the stator winding 12 is transferred from the heat-conducting surfaces 28 of the coil ends 12a constituting the front-end and rear-end coil end groups 12f and 12r to the heat-conducting filler 23, is then transferred from the heat-conducting filler 23 to the front bracket 1 and the rear bracket 2, and is absorbed into the cooling water 15 flowing through the inside of the second rear-end distribution channel portion 25c and the front-end distribution channel 26.

In this manner, according to Embodiment 1, the distribution channels 25 and 26 for the cooling water 15 are disposed in the front bracket 1 and the rear bracket 2, the outer surfaces of the coil ends 12a are reshaped uniformly in a circumferential direction by rolling the coil end groups 12r and 12f to form the smooth heat-conducting surfaces 28, and the heat-conducting filler 23 is filled in between the outer circumferential surface of the front-end coil end group 12f and the front bracket 1 and between the outer circumferential surface of the rear-end coil end group 12r and the rear bracket 2. Thus, the heat-conducting filler 23 is filled in between the front-end coil end group 12f and the front bracket 1 and between the rear-end coil end group 12r and the rear bracket 2 and ensures a state of close contact with the heat-conducting surfaces 28. By rolling the coil end groups 12f and 12r, the slender copper wires 29 are placed in close contact with each other inside the coil ends 12a. Thus, thermal contact between the coil end groups 12f and 12r and the heat-conducting filler 23 is sufficiently ensured, and because heat generated in the stator winding 12 is transferred radially outwards through the inside of the coil ends 12a, is led to the heat-conducting surfaces 28, and is efficiently transferred from the heat-conducting surfaces 28 to the heat-conducting filler 23, temperature increases in the stator winding 12 are suppressed, thereby improving the cooling efficiency of the stator 10. Because temperature increases can be suppressed in the stator 10, which generates the greatest amount of heat in the automotive alternator, the automotive alternator is not heated excessively, and high performance such as high output, for example, can be achieved.

Embodiment 2

In Embodiment 1 above, the slender copper wires 29 are used as the strands of wire, but in Embodiment 2, conductor segments 40 formed by folding and bending a copper material having a rectangular cross section coated with electrical insulation into a general U shape are used as the strands of wire. Furthermore, in Embodiment 1 above, a stator is used in which the number of slots per phase per pole is one, but in Embodiment 2, a stator is used in which the number of slots per phase per pole is two.

Figure 7:
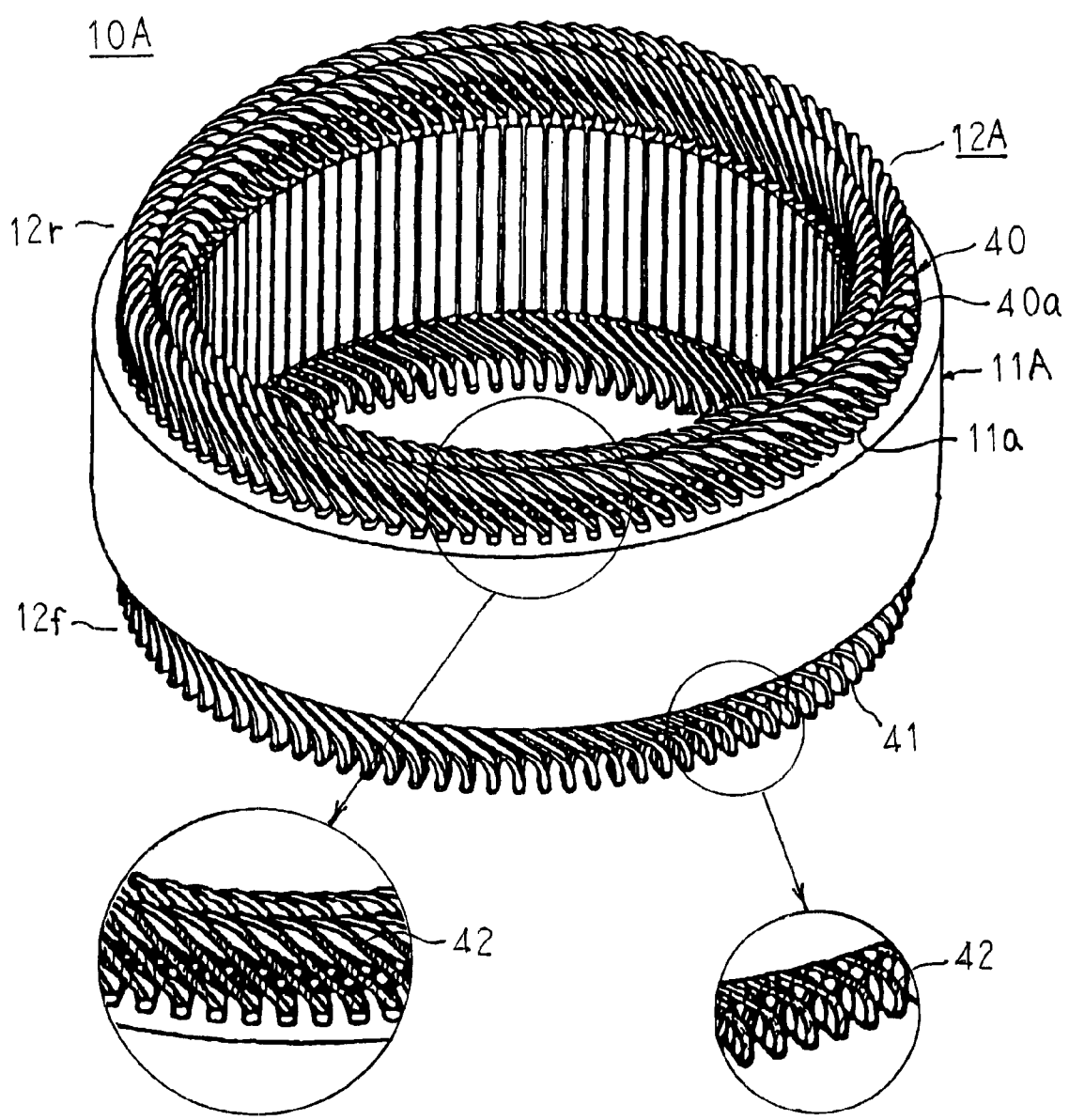
FIG. 7 is a perspective of a stator used in an automotive alternator according to Embodiment 2 of the present invention.
Figure 8:
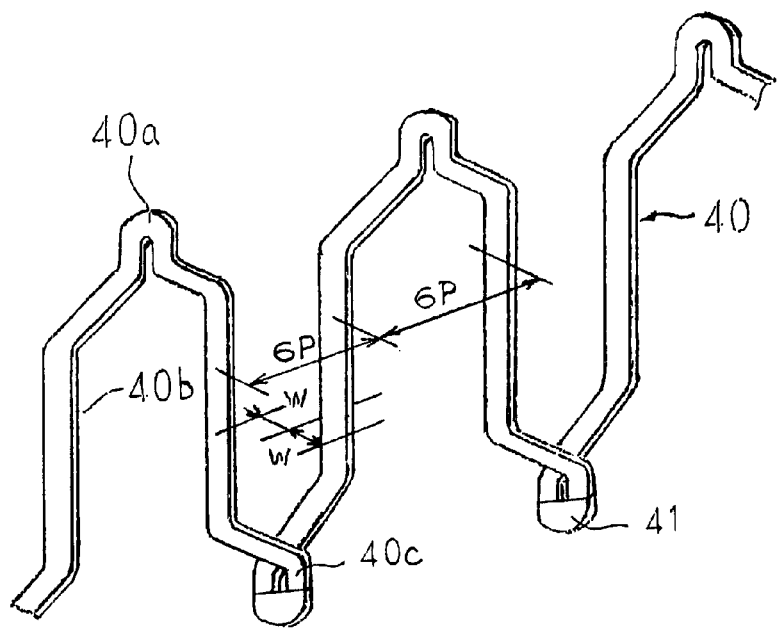
FIG. 8 is a partial perspective explaining a winding construction of a stator winding in the stator used in the automotive alternator according to Embodiment 2 of the present invention.
Figure 9:
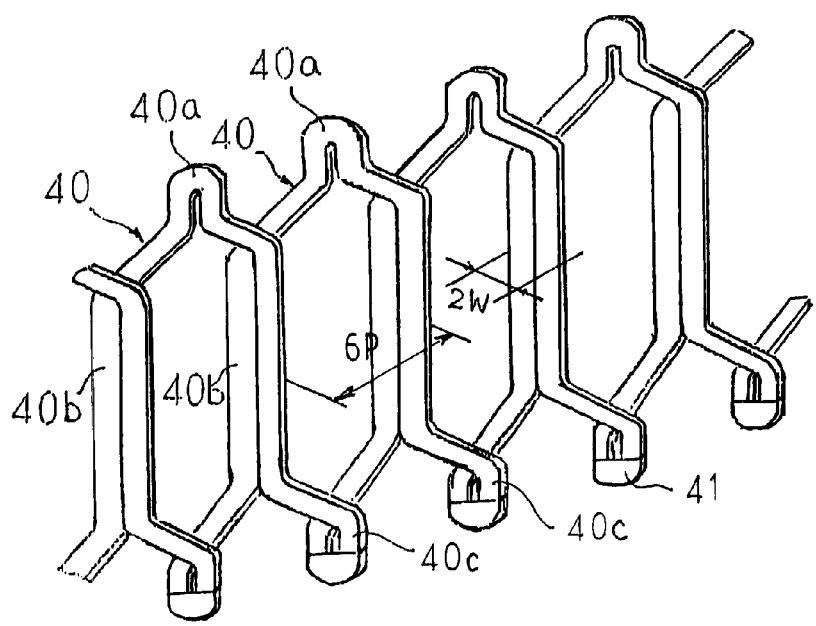
FIG. 9 is a partial perspective explaining the winding construction of the stator winding in the stator used in the automotive alternator according to Embodiment 2 of the present invention.

FIG. 7 is a perspective of a stator used in an automotive alternator according to Embodiment 2 of the present invention, and FIGS. 8 and 9 are partial perspectives explaining a winding construction of a stator winding in the stator shown in FIG. 7. Here, to facilitate explanation, positions into which the conductor segments 40 are inserted into the slots 11a will be called a first address, a second address, a third address, and a fourth address relative to a slot depth direction.

In FIG. 7, the generally U-shaped conductor segments 40 are inserted two at a time from a rear end of a stator core 11A into pairs of slots 11a six slots apart. In other words, first conductor segments 40 are inserted into the second address in first slots 11a and into the first address in second slots 11a six slots away in a clockwise direction, and second conductor segments 40 are inserted into the fourth address in the first slots 11a and into the third address in the second slots 11a six slots away in the clockwise direction. Thus, four straight portions 40b of the conductor segments 40 are housed in each of the slots 11a so as to line up in one row in a slot depth direction (a radial direction) with the longitudinal axes of their rectangular cross sections aligned in the slot depth direction.

In a group of conductor segments 40 inserted into a first slot group constituted by every sixth slot 11a, free end portions 40c of conductor segments 40 extending outwards at a front end from the first address of first slots 11a are joined to free end portions 40c of different conductor segments 40 extending outwards at the front end from the second address of second slots 11a six slots away in a clockwise direction from the first slots 11a to constitute two inner circumferential winding sub-portions having one turn each. Free end portions 40c of conductor segments 40 extending outwards at the front end from the third address of the first slots 11a are joined to free end portions 40c of different conductor segments 40 extending outwards at the front end from the fourth address of the second slots 11a six slots away in a clockwise direction from the first slots 11a to constitute two outer circumferential winding sub-portions having one turn each. A first winding phase portion having four turns is constructed by connecting the inner circumferential winding sub-portions and the outer circumferential winding sub-portions constructed in this manner in series.

In addition, in groups of conductor segments 40 inserted into second to sixth slot groups constituted by every sixth slot 11a, free end portions 40c of the conductor segments 40 are similarly joined together. Then, second to sixth winding phase portions having four turns each are constructed by connecting the inner circumferential winding sub-portions and the outer circumferential winding sub-portions constituted by the conductor segments in each of the second to sixth slot groups in series.

Two three-phase alternating-current winding sets are constructed by connecting three of the first to sixth winding phase portions constructed in this manner into each of two alternating-current connections. The two three-phase alternating-current winding sets constitute the stator winding 12A.

Here, as shown in FIG. 8, each of the inner circumferential winding sub-portions is constructed into a wave shape by joining together free end portions 40c of adjacent conductor segments 40. In other words, the inner circumferential winding sub-portions are constructed into a pattern in which the straight portions 40b are disposed at a pitch of six slots so as to be offset by a width (W) of the conductor segments 40 alternately on a first and second side of a direction of disposal by turn portions 40a and joint portions 41. As shown in FIG. 9, two inner circumferential winding sub-portions installed in a common slot group are offset by a pitch of six slots from each other to form a winding sub-portion pair in which the straight portions 40b are disposed one on top of another. In addition, the inner circumferential winding sub-portions of the first to sixth winding phase portions are constructed such that the winding sub-portion pairs therein are arranged to be offset by a pitch of one slot from those of the next winding phase portion. Furthermore, side surfaces constituted by short sides of the rectangular cross sections of the conductor segments 40 are generally parallel to the direction of disposal. Moreover, the outer circumferential winding sub-portions are constructed in a similar manner to the inner circumferential winding sub-portions.

In the stator 10A manufactured in this manner, the stator winding 12A is constituted by twelve winding sub-portions having one turn each constructed by inserting conductor segments 40 two at a time from a rear end into pairs of slots 11a six slots apart and joining together free end portions 40c extending outwards at the front end from slots 11a six slots apart. Thus, each of the winding sub-portions is installed so as to alternately occupy an inner layer and an outer layer in a slot depth direction in every sixth slot.

Coil ends folded over outside the slots at a rear-end surface of a stator core 11A, that is, the turn portions 40a of the conductor segments 40, are arranged uniformly in a circumferential direction to form two rows in a radial direction, constituting a rear-end coil end group 12r. Coil ends folded over outside the slots at a front-end surface of a stator core 11A, that is, the joint portions 41 joining together the free end portions 40c of the conductor segments 40, are also arranged uniformly in a circumferential direction to form two rows in a radial direction, constituting a front-end coil end group 12f. Outer circumferential surfaces of the coil end groups 12f and 12r are constructed such that smooth side surfaces 42 constituted by the short sides of the rectangular cross sections of the conductor segments 40 extending outwards from the slots ha as far as apex portions are arranged uniformly in a circumferential direction. Moreover, the side surfaces 42 of the conductor segments 40 constitute heat-conducting surfaces.

The stator 10A constructed in this manner is mounted into an automotive alternator in place of the stator 10 above. Thus, as in Embodiment 1 above, because the heat-conducting filler 23 is filled in between the front-end coil end group 12f and the front bracket 1 and between the rear-end coil end group 12r and the rear bracket 2 and ensures a state of close contact with the side surfaces 42 of the conductor segments 40 constituting the heat-conducting surfaces of the coil ends, temperature increases in the stator winding 12A are suppressed, improving the cooling efficiency of the stator 10A.

Furthermore, according to Embodiment 2, because the smooth side surfaces 42 constituted by the short sides of the rectangular cross sections of the conductor segments 40 constitute heat-conducting surfaces, rolling of the coil end groups 12r and 12f is no longer required, enabling costs to be reduced and productivity to be raised proportionately.

Because the coil end groups 12r and 12f are constructed by arranging the joint portions 41 and the turn portions 40a of the conductor segments 40 uniformly in a circumferential direction, the side surfaces 42 of the conductor segments 40 are arranged uniformly in the circumferential direction. Thus, because the heat-conducting surfaces are arranged uniformly in the circumferential direction, the surface area of the heat-conducting surfaces in the outer circumferential surfaces of the coil end groups 12f and 12r is enlarged, the thermal contact surface between the heat-conducting filler 23 and the coil end groups 12f and 12r is increased, and heat from the stator winding is transferred efficiently to the heat-conducting filler 23, raising the cooling efficiency of the stator 11A.

Embodiment 3

Figure 10:
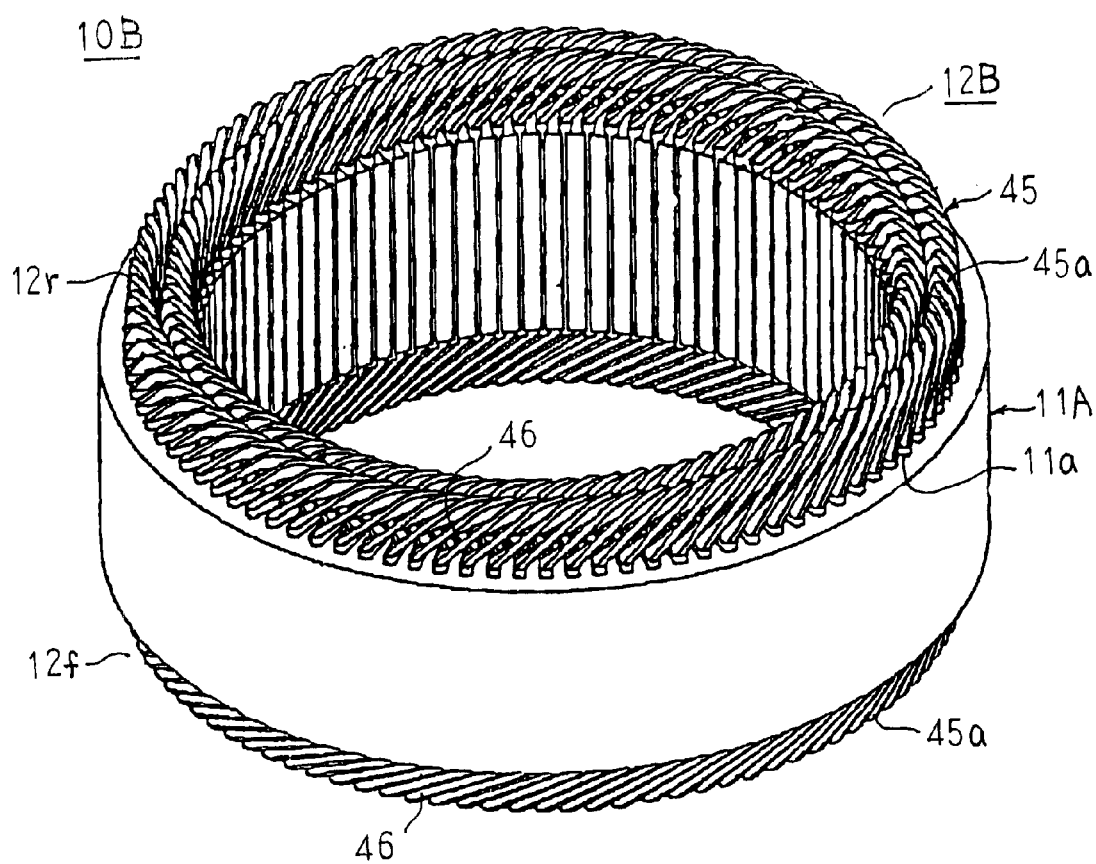
FIG. 10 is a perspective of a stator used in an automotive alternator according to Embodiment 3 of the present invention.
Figure 11:
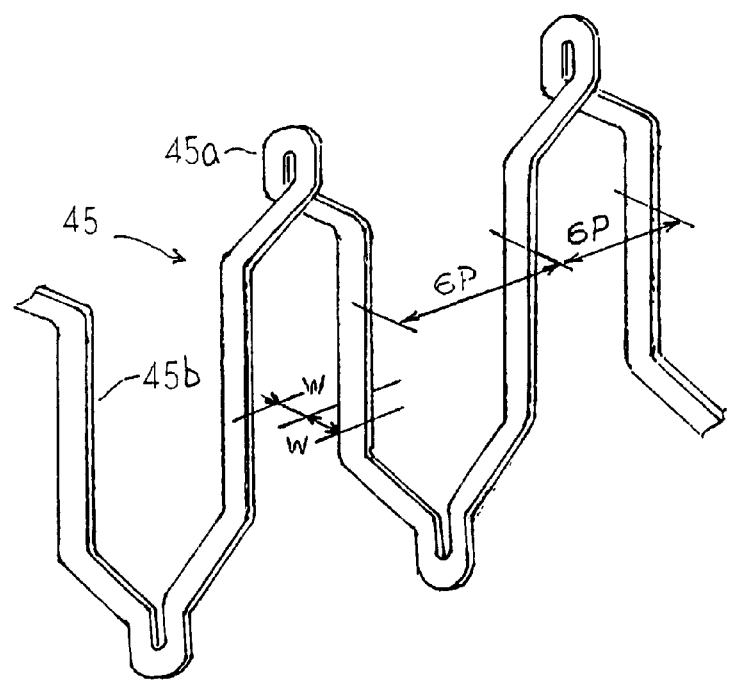
FIG. 11 is a partial perspective explaining a winding construction of a stator winding in the stator used in the automotive alternator according to Embodiment 3 of the present invention.
Figure 12:
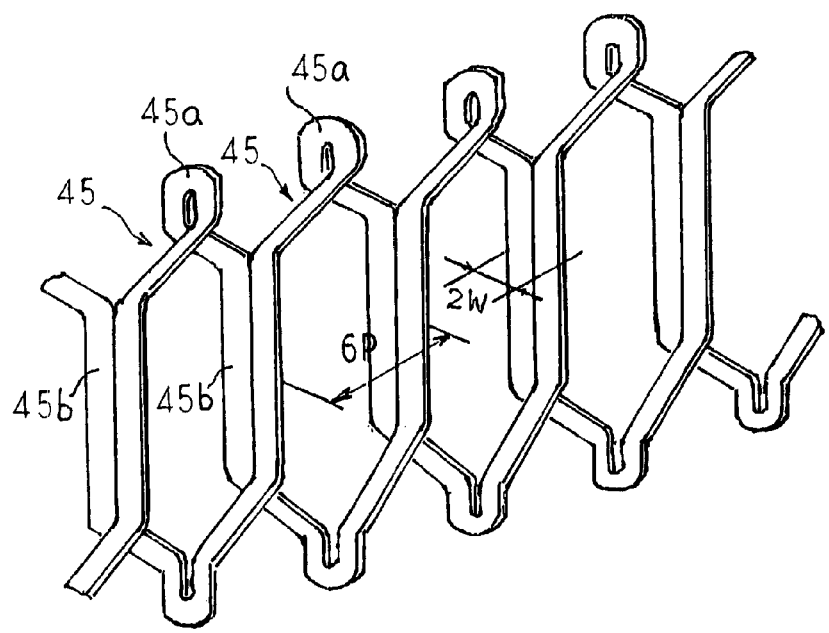
FIG. 12 is a partial perspective explaining the winding construction of the stator winding in the stator used in the automotive alternator according to Embodiment 3 of the present invention.

FIG. 10 is a perspective of a stator used in an automotive alternator according to Embodiment 3 of the present invention, and FIGS. 11 and 12 are partial perspectives explaining a winding construction of a stator winding in the stator shown in FIG. 10, respectively.

In Embodiment 3, continuous conductor wires 45 composed of a copper material having a rectangular cross section coated with electrical insulation are used as the strands of wire.

In FIG. 10, in a first slot group constituted by every sixth slot 11a, a first continuous conductor wire 45 is installed in a wave shape so as to alternately occupy the first address and the second address in every sixth slot, and a second continuous conductor wire 45 is installed in a wave shape so as to alternately occupy the second address and the first address in every sixth slot, to form two inner circumferential winding sub-portions having one turn each. In addition, a third continuous conductor wire 45 is installed in a wave shape so as to alternately occupy the third address and the fourth address in every sixth slot, and a fourth continuous conductor wire 45 is installed in a wave shape so as to alternately occupy the fourth address and the third address in every sixth slot, forming two outer circumferential winding sub-portions having one turn each. A first winding phase portion having four turns is formed by connecting these inner circumferential winding sub-portions and outer circumferential winding sub-portions in series.

In addition, in second to sixth slot groups constituted by every sixth slot 11a, continuous conductor wires 45 are similarly installed, and second to sixth winding phase portions having four turns each are formed by connecting the inner circumferential winding sub-portions and the outer circumferential winding sub-portions in series.

Two three-phase alternating-current winding sets are constructed by connecting three of the first to sixth winding phase portions constructed in this manner into each of two alternating-current connections. The two three-phase alternating-current winding sets constitute the stator winding 12B.

Moreover, four continuous conductor wires 45 are housed in each of the slots 11a so as to line up in one row in a slot depth direction (radial direction) with the longitudinal axis of their rectangular cross sections aligned with the slot depth direction. Furthermore, side surfaces 46 constituted by short sides of the rectangular cross sections of the continuous conductor wires 45 are generally parallel to the direction of disposal.

Here, as shown in FIG. 11, each of the inner circumferential winding sub-portions is constructed into a wave-shaped pattern in which straight portions 45b of the continuous conductor wires 45 are disposed at a pitch of six slots so as to be offset by a width (W) of the continuous conductor wires 45 alternately on a first and second side of a direction of disposal by turn portions 45a of the continuous conductor wires 45. As shown in FIG. 12, two inner circumferential winding sub-portions installed in a common slot group are offset by a pitch of six slots from each other to form a winding sub-portion pair in which the straight portions 45b are disposed one on top of another. In addition, the inner circumferential winding sub-portions of the first to sixth winding phase portions are constructed such that the winding sub-portion pairs therein are arranged to be offset by a pitch of one slot from those of the next winding phase portion. Moreover, the outer circumferential winding sub-portions are constructed in a similar manner to the inner circumferential winding sub-portions.

In the stator 10B manufactured in this manner, the stator winding 12B is constituted by twelve winding sub-portions having one turn each, each being constructed by installing one continuous conductor wire 45 so as to alternately occupy an inner layer and an outer layer in a slot depth direction in every sixth slot.

Coil ends folded over outside the slots at front-end and rear-end surfaces of the stator core 11A, that is, the turn portions 45a of the continuous conductor wires 45, are arranged uniformly in a circumferential direction to form two rows in a radial direction, constituting front-end and rear-end coil end groups 12f and 12r. Outer circumferential surfaces of the coil end groups 12f and 12r are constructed such that side surfaces 46 constituted by the short sides of the rectangular cross sections of the continuous conductor wires 45 extending outwards from the slots 11a as far as apex portions are arranged uniformly in a circumferential direction. The smooth side surfaces 46 constituted by the short sides of the rectangular cross sections of the continuous conductor wires 45 extending outwards from the slots 11a as far as the apex portions face radially outwards from the stator core 11A and constitute heat-conducting surfaces.

Thus, Embodiment 3 is constructed in a similar manner to Embodiment 2 above except for the fact each winding sub-portion having one turn is constituted by one continuous conductor wire 45. Consequently, similar effects to those in Embodiment 2 above can also be achieved in Embodiment 3.

In Embodiment 3, because each winding sub-portion having one turn is constituted by one continuous conductor wire 45, the complicated operation of joining the conductor segments 40 required in Embodiment 2 above can be omitted.

In Embodiment 2 above, the front-end coil end group 12f is constituted by coil ends formed by joining together the free end portions 40c of the conductor segments 40. Thus, because the joint portions 41 are present on the apex portions of the coil ends, the side surfaces 42 of the conductor segments 40 cannot form smooth curved surfaces relative to an axial direction of the conductor segments 40 at the apex of the coil ends. In Embodiment 3, on the other hand, the front-end coil end group 12f is constituted like the rear-end coil end group 12r by coil ends constituted by the turn portions 45a of the continuous conductor wires 45. Thus, even at the apex portions of the coil ends, the side surfaces 46 of the continuous conductor wires 45 constitute smooth curved surfaces relative to an axial direction of the continuous conductor wires 45. Thus, the surface area of the heat-conducting surfaces is enlarged, enabling the thermal contact surface between the heat-conducting filler 23 and the front-end coil end group 12f to be increased.

Next, a method for assembling a stator according to Embodiment 3 will be explained.

Figure 13:
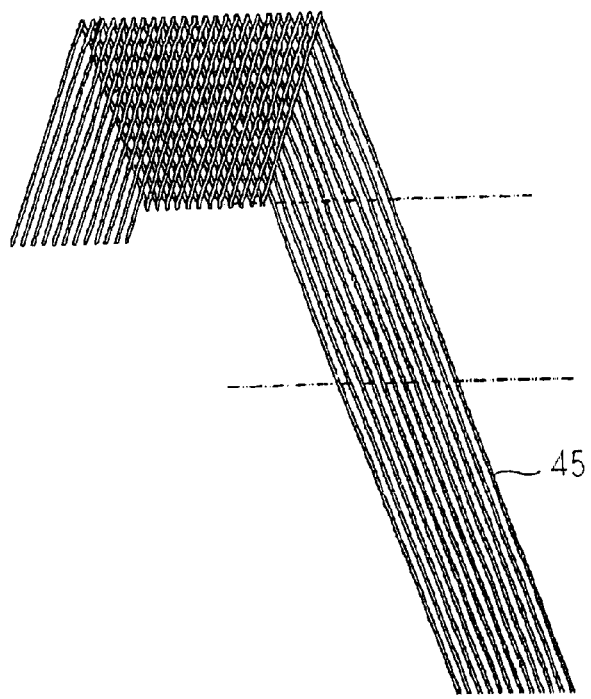
FIG. 13 is a process diagram explaining a method of manufacture for the stator winding in the stator used in the automotive alternator according to Embodiment 3 of the present invention.

First, twelve continuous conductor wires 45 are lined up in a plane at a pitch of one slot. Then, as shown in FIG. 13, the twelve continuous conductor wires 45 are folded over together at a predetermined pitch (at the positions of the double-dotted chain lines), forming a belt-shaped winding unit 47 in which the twelve continuous conductor wires 45 are wound into a helical shape.

Figure 14:
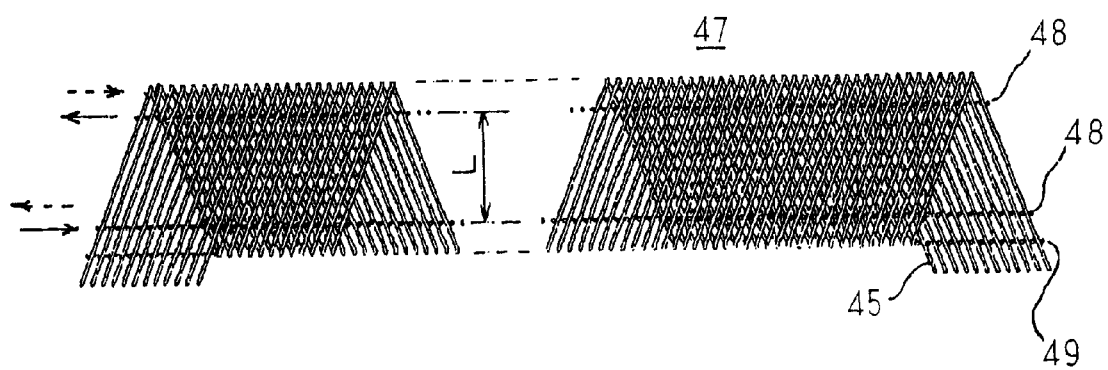
FIG. 14 is a process diagram explaining the method of manufacture for the stator winding in the stator used in the automotive alternator according to Embodiment 3 of the present invention.

A pair of pin groups 48 is inserted between the continuous conductor wires 45 from a front side of the winding unit 47 at positions separated by a distance L relative to a width direction of the winding unit 47. Similarly, a pair of pin groups 48 is inserted between the continuous conductor wires 45 from a rear side of the winding unit 47 at positions separated by a distance L in a width direction of the winding unit 47. In addition, position-regulating pin groups 49 are inserted between the continuous conductor wires 45 at end portions in a width direction of the winding unit 47. Thus, the pin groups 48 and 49 are set as shown in FIG. 14. Here, the distance L generally matches a groove length of the slots 11a.

Then, the pair of pin groups 48 inserted between the continuous conductor wires 45 from the front side of the winding unit 47 are moved in mutually opposite directions in a longitudinal direction of the winding unit 47, as indicated by solid arrows in FIG. 14. Similarly, the pair of pin groups 48 inserted between the continuous conductor wires 45 from the rear side of the winding sub-portion 47 are moved in mutually opposite directions in a longitudinal direction of the winding unit 47, as indicated by broken arrows in FIG. 14. At this time, the continuous conductor wires 45 are prevented from coming apart because the position-regulating pin groups 49 are inserted between the continuous conductor wires 45.

Figure 15:
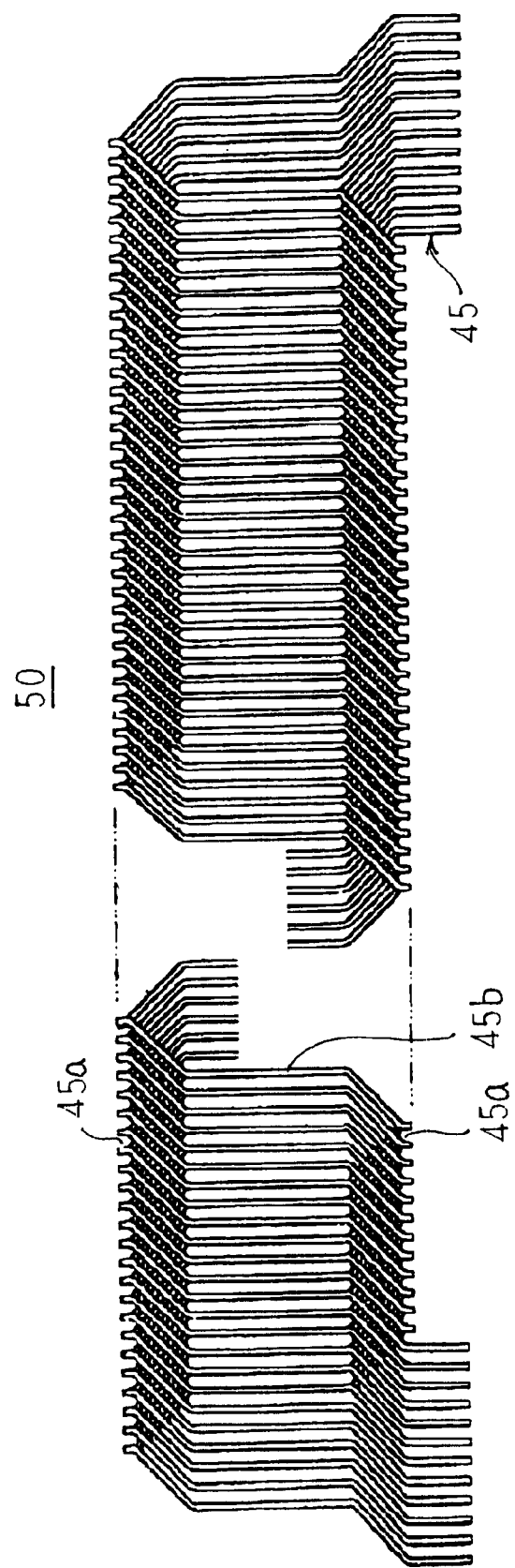
FIG. 15 is a plan of a winding assembly constituting the stator winding in the stator used in the automotive alternator according to Embodiment 3 of the present invention.

Thus, the portions of the continuous conductor wires 45 positioned between the pairs of pin groups 48 are deformed so as to become perpendicular to the longitudinal direction of the winding unit 47, becoming the straight portions 45*b* housed inside the slots 11*a*. The portions of the continuous conductor wires 45 positioned outside the pairs of pin groups 48 become the turn portions 45*a* linking straight portions 45*b* six slots apart. The winding assembly 50 shown in FIG. 15 is manufactured in this manner. This winding assembly 50 has a construction equivalent to six of the winding sub-portion pairs shown in FIG. 12 offset by a pitch of one slot from each other. In other words, the winding assembly 50 is constructed such that the continuous conductor wires 45 are formed into a pattern in which the straight portions 45*b* are disposed at a pitch of six slots and linked by the turn portions 45*a* and adjacent straight portions 45*b* are alternately offset by a width of the continuous conductor wires 45 on a first and second side of a direction of disposal by the turn portions 45*a*, pairs of continuous conductor wires 45 being formed by disposing two continuous conductor wires 45 so as to be offset by a pitch of six slots from each other with straight portions 45*b* stacked one on top of another, six pairs of continuous conductor wires 45 being offset by a pitch of one slot from each other.

Figure 16A:
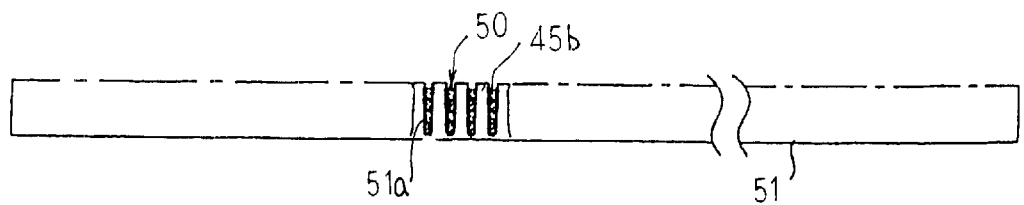
FIG. 16A is a process diagram explaining a method of manufacture for the stator used in the automotive alternator according to Embodiment 3 of the present invention.
Figure 16B:
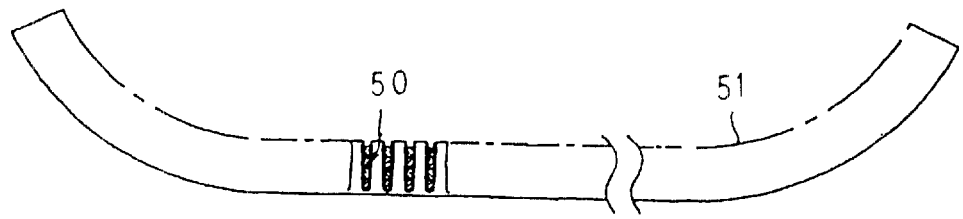
FIG. 16B is a process diagram explaining the method of manufacture for the stator used in the automotive alternator according to Embodiment 3 of the present invention.
Figure 16C:
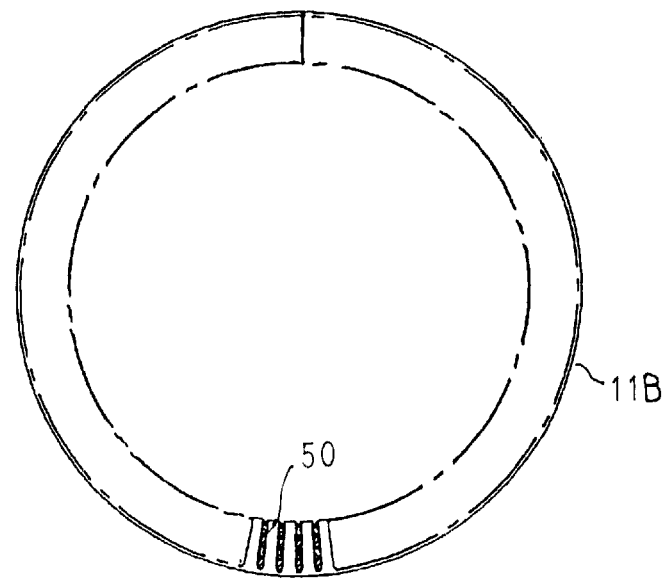
FIG. 16C is a process diagram explaining the method of manufacture for the stator used in the automotive alternator according to Embodiment 3 of the present invention.

A rectangular parallelepiped core 51 is manufactured by laminating a predetermined number of sheets of an SPCC material, which is a magnetic material, formed with trapezoidal slots 51*a* at a predetermined pitch and laser welding an outer circumferential portion thereof. Insulators (not shown) are mounted in each of the slots 51*a* of the rectangular parallelepiped core 51, and then, as shown in FIG. 16A, two winding assemblies 50 are mounted one on top of the other in the rectangular parallelepiped core 51 by inserting the straight portions 45*b* into the slots. Next, as shown in FIG. 16B, the rectangular parallelepiped core 51 mounted with the two winding assemblies 50 is rolled up. Then, as shown in FIG. 16C, first and second end portions of the rolled up core 51 are abutted, and the abutted portions are laser welded to obtain a cylindrical stator core 11B mounted with the two winding assemblies 50. In addition, the continuous conductor wires 45 are connected to obtain the stator 11B shown in FIG. 10.

Because the winding assembly 50 integrally constructed from twelve continuous conductor wires 45 each formed into a wave shape so as to alternately occupy an inner layer and an outer layer in a slot depth direction in every sixth slot 11*a* is manufactured this manner, the operation of installing the stator winding 12B is simplified, and the number of joints in the continuous conductor wires 45 is significantly reduced, improving the productivity of the stator.

Now, the winding assembly used in Embodiment 3 above is manufactured so as to be constituted by a group of winding sub-portions each having one turn when installed in the stator core 11B, but winding assembly units may be used in which the winding assembly 50 is divided into two or three parts in a longitudinal direction. In that case, the group of winding sub-portions each having one turn is constructed by installing the winding assembly units in the rectangular parallelepiped core 51 so as to line up in one row, rolling up the rectangular parallelepiped core 51, abutting and joining first and second end portions of the core, then joining each of the continuous conductor wires 45 in the winding assembly units.

In Embodiment 3 above, because the number of slots per phase per pole is two, the winding assembly 50 is manufactured using twelve continuous conductor wires 45, but the invention can be applied to cases in which the number of slots per phase per pole is one, or three or more, and the number of continuous conductor wires 45 constituting the winding assembly 50 may be selected appropriately so as to match the number of slots per phase per pole. For example, when the number of slots per phase per pole is one, the winding assembly is constructed such that the continuous conductor wires are formed into pattern in which straight portions are disposed at a pitch of three slots and linked by turn portions, and adjacent straight portions are alternately offset by a width of the continuous conductor wires on a first and second side of a direction of disposal by the turn portions, pairs of continuous conductor wires being formed by disposing two continuous conductor wires so as to be offset by a pitch of three slots from each other with straight portions stacked one on top of another, three pairs of continuous conductor wires being offset by a pitch of one slot from each other.

In Embodiment 3 above, the continuous conductor wires 45 of the winding assembly 50 are formed into a pattern in which the straight portions 45*b* are alternately offset by a width of the continuous conductor wires 45 by the turn portions 45*a*, but continuous conductor wires of a winding assembly may be formed into a pattern in which straight portions are alternately offset by twice a width of the continuous conductor wires by turn portions. In that case, an air gap equivalent to two continuous conductor wires is formed between the straight portions of continuous conductor wires constituting a pair, and a stator winding similar to that of Embodiment 3 can be obtained by inserting the above-mentioned winding assembly 50 into a winding assembly manufactured in this manner and installing the two into a stator core.

In Embodiment 2 above, the conductor segments 40 are inserted into the slots of the stator core 11A, then free end portions 40*c* are joined together, but an assembly equivalent to the winding assembly shown in FIG. 15 may be prepared by joining together the free end portions 40*c* of the conductor segments 40 before installation in the stator core 11A. In that case, the free end portions 40*c* of the conductor segments 40 do not have to be joined or the free end portions 40*c* of the conductor segments 40 bent while the conductor segments 40 are inserted into the stator core 11A, significantly improving workability.

Embodiment 4

Figure 17:
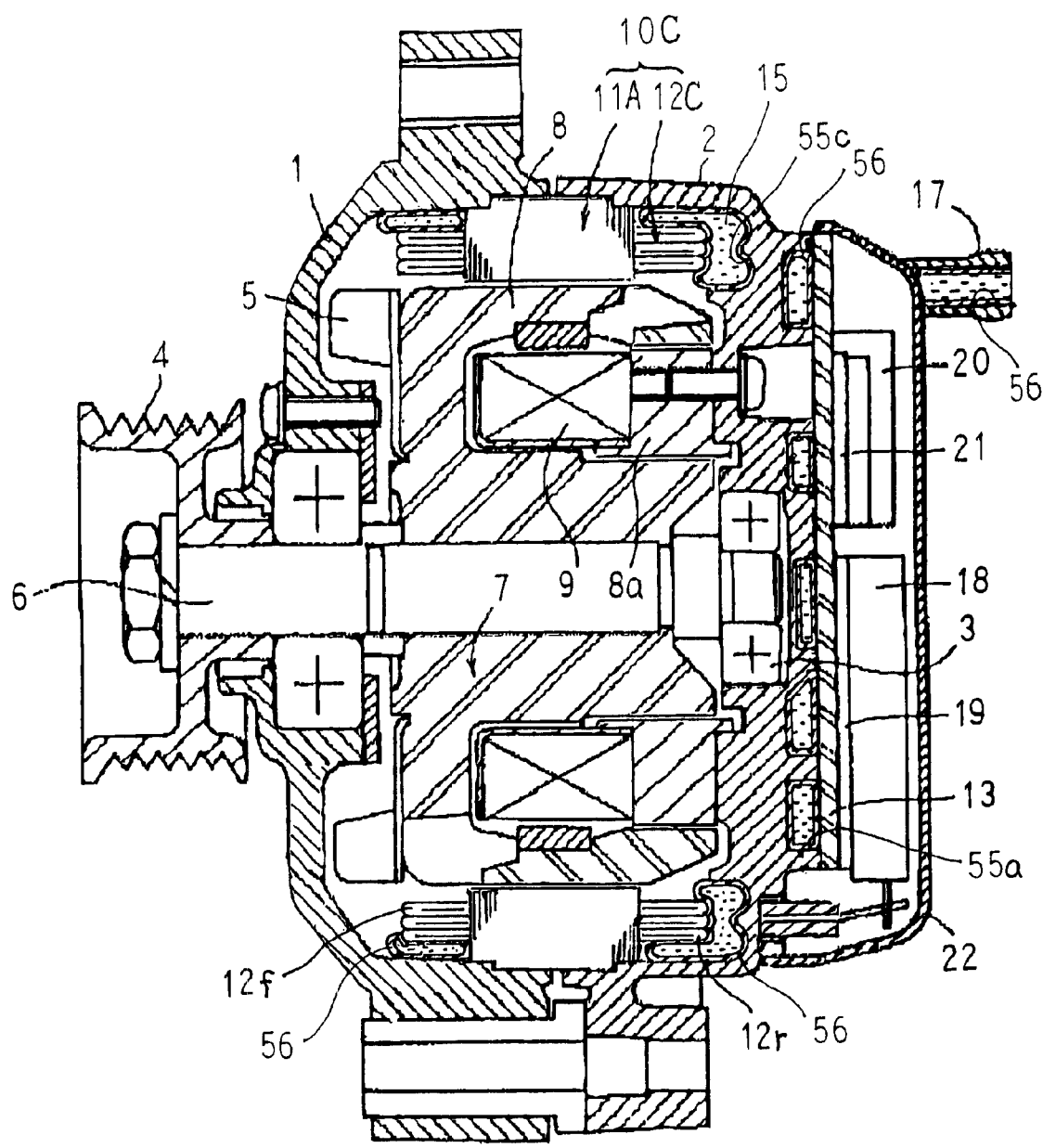
FIG. 17 is a longitudinal section of an automotive alternator according to Embodiment 4 of the present invention.
Figure 18:
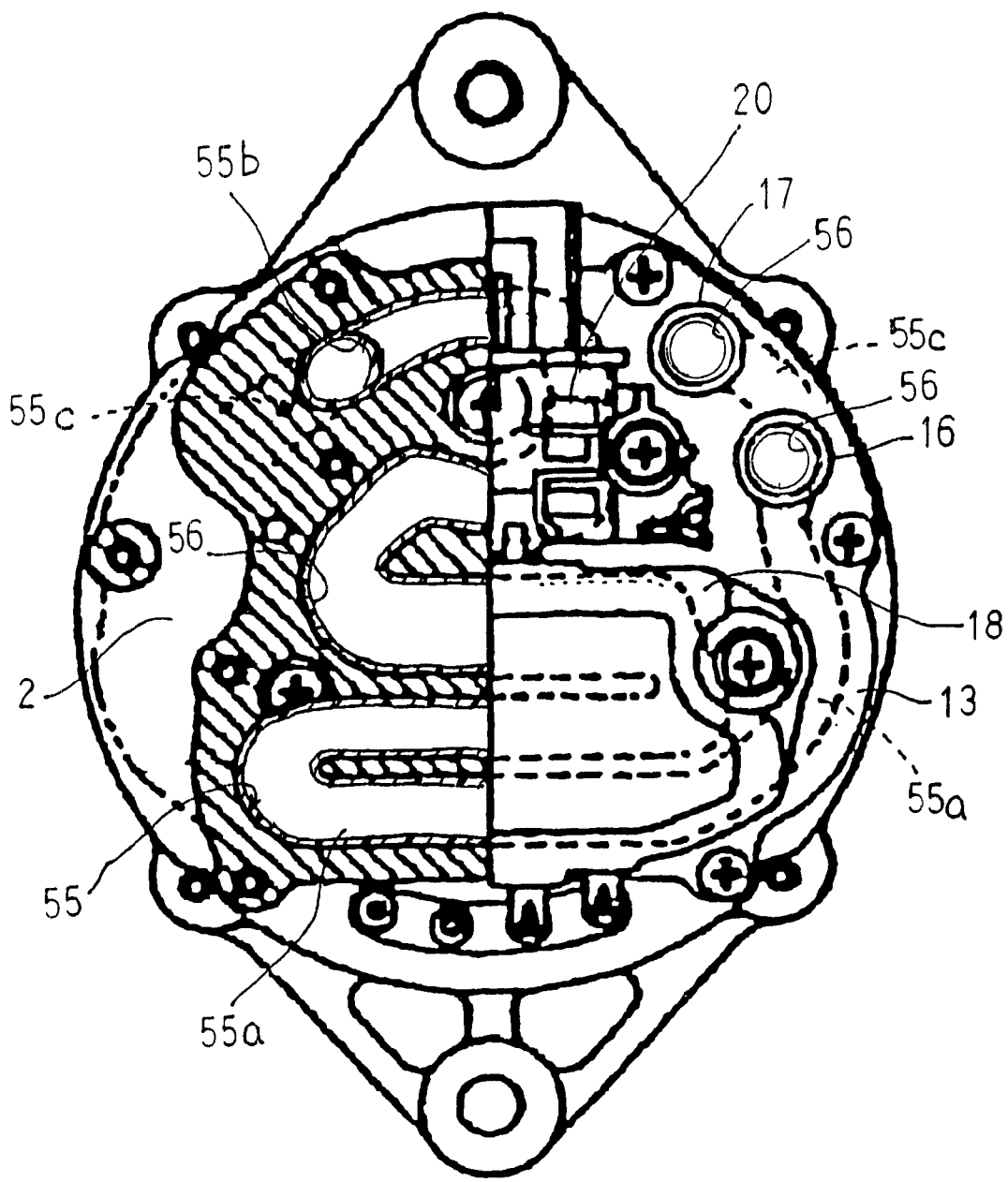
FIG. 18 is a partial cutaway elevation of the automotive alternator according to Embodiment 4 of the present invention viewed from a rear end.
Figure 19:
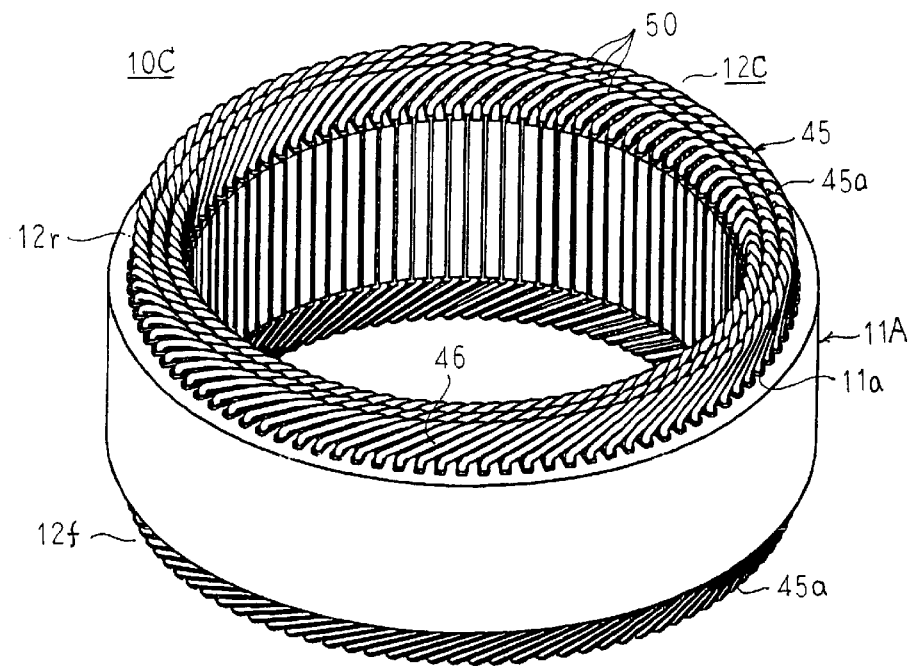
FIG. 19 is a perspective of a stator used in the automotive alternator according to Embodiment 4 of the present invention.
Figure 20:
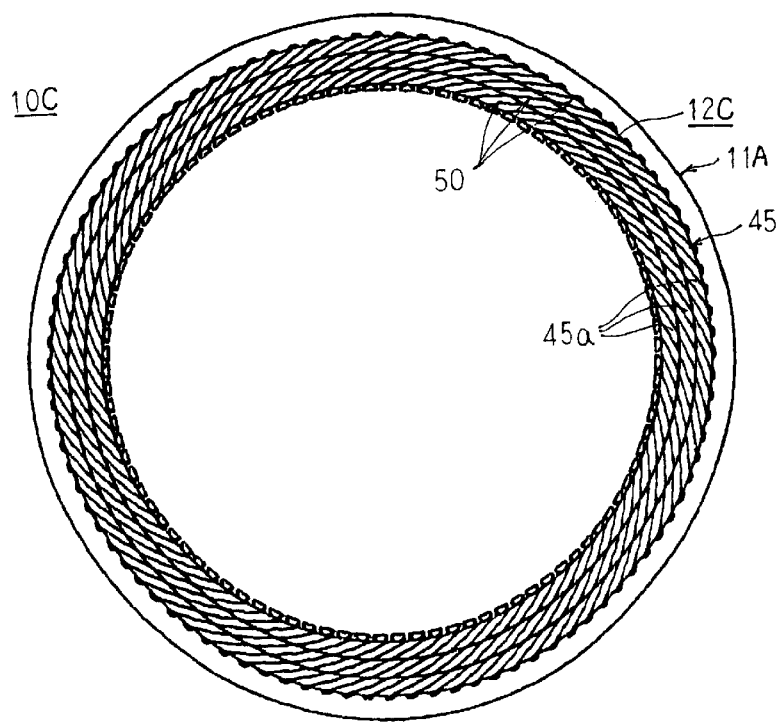
FIG. 20 is a top elevation of the stator used in the automotive alternator according to Embodiment 4 of the present invention.

FIG. 17 is a longitudinal section of an automotive alternator according to Embodiment 4 of the present invention, FIG. 18 is a partial cutaway elevation of the automotive alternator shown in FIG. 17 viewed from a rear end, and FIGS. 19 and 20 are a perspective and a top elevation of a stator used in the automotive alternator shown in FIG. 17, respectively.

In FIGS. 17 and 18, a tube housing groove 55 is recessed into the rear bracket 2, and this tube housing groove 55 is closed by mounting the bracket cover 13 to the rear bracket 2. This tube housing groove 55 is constituted by: a first tube housing groove portion 55*a* disposed in the bracket cover 13 side of the rear bracket 2, a first end of the first tube housing groove portion 55*a* being linked to the inflow pipe 16; and a second tube housing groove portion 55*c* disposed in an annular shape so as to be exposed on the rotor 7 side of the rear bracket 2 and be disposed opposite apex portions of the rear-end coil end group 12*r*, a first end of the second tube housing groove portion 55*c* communicating with a second end of the first tube housing groove portion 55a through a communicating aperture 55b and a second end of the second tube housing groove portion 55c being linked to the outflow pipe 17. A tube 56 having good thermal conductivity constituting a distribution channel for the liquid coolant is disposed so as to be housed in the first tube housing groove portion 55a from the inflow pipe 16, pass through the communicating aperture 55b, be housed in the second tube housing groove portion 55c, and reach the outflow pipe 17. A portion of the tube 56 branches off and is disposed in an annular shape between the front-end coil end group 12f and the front bracket 1. The tube 56 is inflated by flowing cooling water 15 through the tube 56, and comes into close contact with the outer circumferential surfaces and apex portions of the front-end and rear-end coil end groups 12f and 12r. Moreover, the tube 56 is composed of silicone rubber or the like having high thermal conductivity, flame resistance, and heat resistance.

As shown in FIG. 19, the stator 10C is constructed by installing winding assemblies 50 in three layers into the stator core 11A. Thus, a stator winding 12C is constituted by two three-phase alternating-current winding sets in which winding phase portions having six turns each are connected into alternating-current connections. In addition, as shown in FIG. 20, the stator winding 12C is constructed such that turn portions 45a disposed circumferentially so as to line up in three rows radially are compressed from first and second sides in a radial direction so as to be in close contact with each other.

Moreover, the rest of the construction is constructed in a similar manner to Embodiment 3 above.

Because the side surfaces 46 constituted by the short sides of the rectangular cross sections of the continuous conductor wires 45 extending outwards from the slots 11a as far as the apex portions face radially outwards from the stator core and constitute heat-conducting surfaces, and outer circumferential surfaces of the coil end groups 12f and 12r are constructed such that the side surfaces 46 constituted by the short sides of the rectangular cross sections of the continuous conductor wires 45 are arranged uniformly in a circumferential direction, similar effects to those in Embodiment 3 above can also be achieved in Embodiment 4.

According to Embodiment 4, because the turn portions 45a disposed circumferentially so as to line up in three rows radially are compressed from first and second sides in a radial direction so as to be in close contact with each other, heat generated in the inner circumferential and intermediate winding assemblies is transferred to the turn portions 45a of the outer circumferential winding assembly through contacting portions between the turn portions 45a, is further transferred from the heat-conducting surfaces to the tube 56, and is absorbed by the cooling water 15. Thus, even though the number of turns is increased, temperature increases in the stator winding 12C are suppressed.

Because the tube 56, which is a distribution channel for the cooling water 15, is directly in close contact with the outer circumferential surfaces and the apex portions of the front-end and rear-end coil end groups 12f and 12r, cooling is increased by directly cooling the stator winding 12C compared to Embodiments 1 to 3 which was indirect cooling by the interposition of the heat-conducting filler 23.

Because each of the winding phase portions of the stator winding 12C is constituted by six turns, high output is achieved.

Embodiment 5

Figure 21:
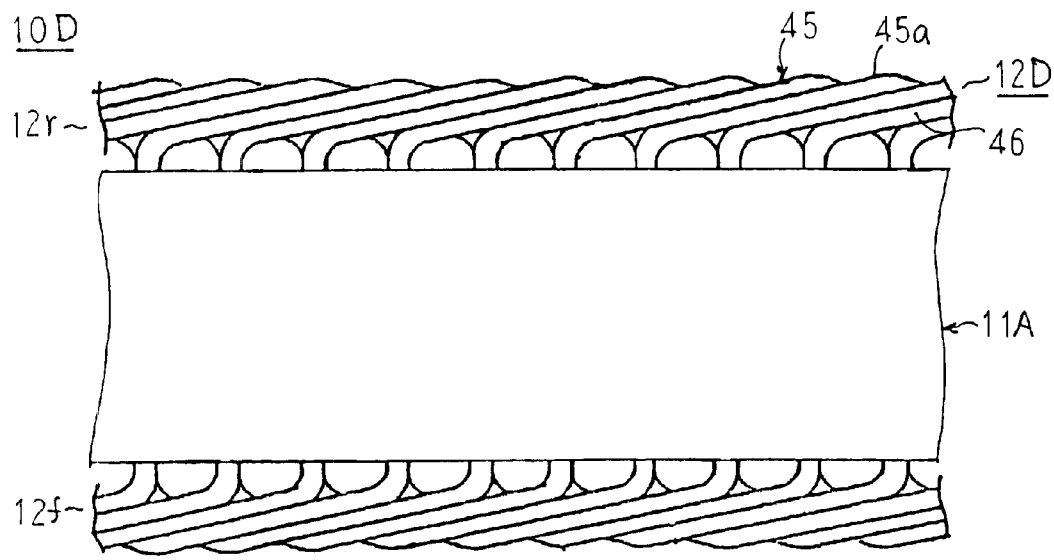
FIG. 21 is a diagram of part of a stator used in the automotive alternator according to Embodiment 5 of the present invention viewed from an outer circumferential side.

As shown in FIG. 21, in Embodiment 5, portions of the continuous conductors 45 extending outwards from the slots to the apex portions are inclined such that the turn portions 45a disposed circumferentially come into close contact with each other.

Moreover, the rest of the construction is constructed in a similar manner to Embodiment 4 above.

In a stator 10D according to Embodiment 5, the outer circumferential surfaces of the front-end and rear-end coil end groups 12f and 12r of a stator winding 12D are constructed by lining up the smooth side surfaces 46 formed by the short sides of the rectangular cross sections of the continuous conductor wires 45 circumferentially. Thus, circumferential gaps between the side surfaces 46 of the continuous conductor wires 45 are eliminated, and the outer circumferential surfaces of the front-end and rear-end coil end groups 12f and 12r are formed into smooth surfaces constituted only by the side surfaces 46 formed by the short sides of the rectangular cross sections of the continuous conductor wires 45. When the tube 56 is inflated, it comes into close contact with the smooth surfaces constituted only by the side surfaces 46. Thus, the surface area of the heat-conducting surfaces thermally contacting the tube 56 is significantly increased, improving cooling efficiency.

Embodiment 6

Figure 22:
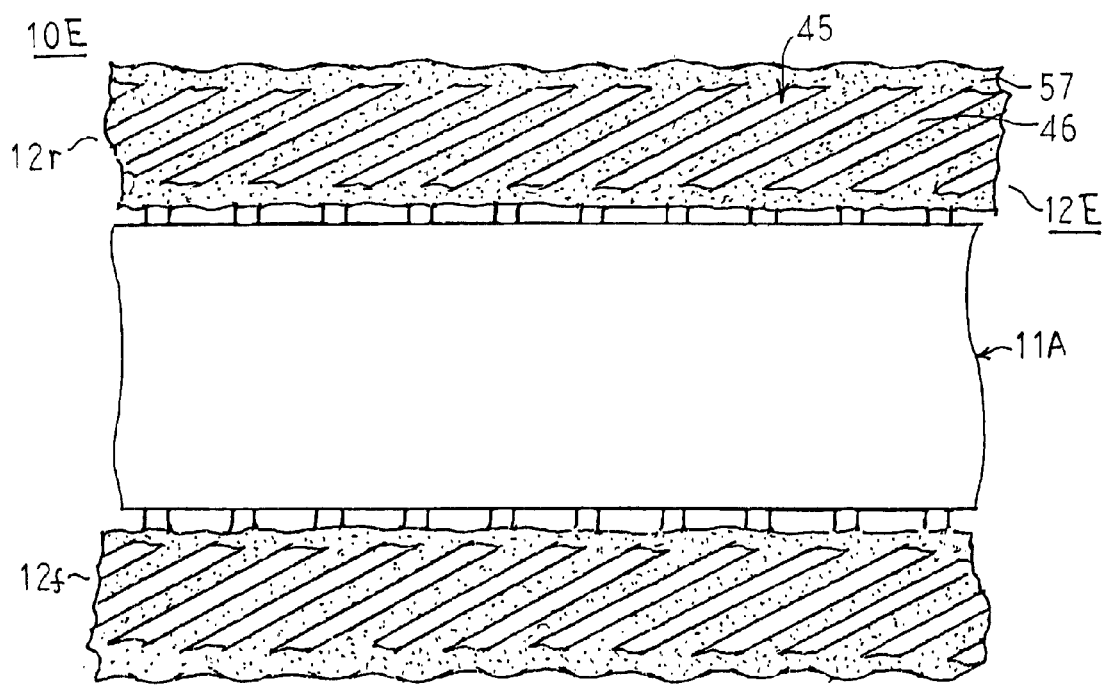
FIG. 22 is a diagram of part of a stator used in the automotive alternator according to Embodiment 6 of the present invention viewed from an outer circumferential side.

As shown in FIG. 22, in Embodiment 6, resin portions 57 are formed on the outer circumferential surfaces of the front-end and rear-end coil end groups 12f and 12r so as to be positioned in a common plane with the side surfaces 46 formed by the short sides of the rectangular cross sections of the continuous conductor wires 45. In other words, the side surfaces 46 of the continuous conductor wires 45 constituting the heat-conducting surfaces are exposed from the resin portions 57. Thus, the outer circumferential surfaces of the front-end and rear-end coil end groups 12f and 12r are formed into smooth surfaces constituted by the side surfaces 46 formed by the short sides of the rectangular cross sections of the continuous conductor wires 45 and the resin portions 57. Here, for example, an epoxy resin having alumina added thereto, is used in the resin portions 57, alumina having a high coefficient of thermal conductivity.

Moreover, the rest of the construction is constructed in a similar manner to Embodiment 4 above.

In a stator 10E according to Embodiment 6, the outer circumferential surfaces of the front-end and rear-end coil end groups 12f and 12r of a stator winding 12E are formed into smooth surfaces constituted by the side surfaces 46 formed by the short sides of the rectangular cross sections of the continuous conductor wires 45 and the resin portions 57. Thus, circumferential gaps between the side surfaces 46 of the continuous conductors 45 are eliminated, and when the tube 56 is inflated, it comes into close contact with the side surfaces 46 and the resin portions 57. Heat is transferred directly from the side surfaces 46 to the tube 56, and is also transferred from the continuous conductor wires 45 through the resin portions 57 to the tube 56. Thus, the thermal contact surface area between the tube 56 and the front-end and rear-end coil end groups 12f and 12r is significantly increased, improving cooling efficiency.

Moreover, in each of the above embodiments, the front-end and rear-end coil end groups 12f and 12r are cooled by cooling water, but the front-end coil end group 12f may be cooled by disposing an air intake aperture and an air discharge aperture in the front bracket 1 and forming a cooling air flow using the fan 5.

In each of the above embodiments, cooling water is used as the liquid coolant, but oil can also be used as the liquid coolant.

In each of Embodiments 2 to 6, strands of wire having a rectangular conductor cross section are used, but sufficient thermal conductivity can also be achieved using strands of wire having a circular conductor cross section because the alignment of the coil ends is extremely high.

The present invention is constructed in the above manner and exhibits the effects described below.

According to one aspect of the present invention, there is provided an automotive alternator including:

a stator having a stator core formed with slots extending axially at a predetermined pitch in a circumferential direction and a stator winding installed in the stator core;

a rotor rotatably disposed on an inner circumferential side of the stator; and a bracket for supporting the stator and the rotor, wherein a coil end group of the stator winding is constructed such that coil ends folded back outside the slots at an end surface of the stator core are arranged circumferentially, wherein a predetermined region of outer surfaces of the coil ends in a radial direction of the stator core constitutes a circumferentially-smooth heat-conducting surface, the outer surfaces facing radially outwards from the stator core and extending from a vicinity of the end surface of the stator core to apex portions of the coil ends, and wherein a distribution channel for a liquid coolant is disposed for absorbing heat generated in the stator and conducted from the heat-conducting surface, whereby the heat-conducting surface area of the coil end group is enlarged, and heat generated in the stator is conducted efficiently to the liquid coolant, achieving a superior cooling effect and providing an automotive alternator enabling temperature increases in a stator to be suppressed.

The distribution channel may be formed inside the bracket, a thermally-conductive resin being filled between the coil end group and the bracket in a state of general contact with the heat-conducting surface, whereby heat generated in the stator is conducted efficiently from the heat-conducting surfaces of the coil ends through the thermally-conductive resin and the bracket to the liquid coolant.

The distribution channel may be constituted by a tube composed of a thermally-conductive material, a portion of the tube being disposed in a state of general contact with the heat-conducting surface of the coil end group, whereby heat generated in the stator is conducted efficiently from the heat-conducting surfaces of the coil ends through the tube to the liquid coolant.

The stator winding may be provided with a plurality of winding sub-portions each constructed by installing a strand of wire at intervals of a predetermined number of slots so as to alternately occupy an inner layer and an outer layer in a slot depth direction within the slots, turn portions of the strands of wire which are folded back outside the slots at the end surface of the stator core forming the coil ends and lining up generally uniformly in a circumferential direction to constitute the coil end group, whereby heat-conducting surfaces on the coil ends are arranged uniformly in a circumferential direction around the entire circumference of the outer circumferential surface of the coil end group, raising thermal conductivity from the coil end group to the liquid coolant and raising cooling efficiency.

The turn portions may be disposed circumferentially so as to line up in a plurality of rows radially, radially-adjacent turn portions being in general contact with each other, whereby heat generated in the inner circumferential winding assemblies is conducted to the turn portions of the outer circumferential winding assembly through contacting portions among the turn portions, raising cooling efficiency.

The strand of wire may be formed with a rectangular cross-sectional shape, the heat-conducting surface being constituted by a flat side surface of the strand of wire, whereby the surface area of the heat-conducting surface is enlarged, further raising thermal conductivity from the coil end group to the liquid coolant.

The turn portions may be disposed circumferentially such that intermediate portions of the turn portions are in close proximity with each other, the intermediate portions being between portions where the turn portions extend out from the slots and portions where the turn portions are folded back, whereby the heat-conducting surfaces on the coil ends are arranged uniformly and continuously in a circumferential direction around the entire circumference of the outer circumferential surface of the coil end group, further raising thermal conductivity from the coil end group to the liquid coolant.

A resin may be filled between the turn portions such that a surface of the resin is positioned in a common plane with a surface of the strand of wire, the heat-conducting surface being constituted by a smooth surface composed of the surface of the strand of wire and the surface of the resin, further raising thermal conductivity from the coil end group to the liquid coolant.

The strand of wire may be a continuous wire, whereby the turn portions are constituted by continuous wires, enabling enlargement of the surface area of smooth heat-conducting surfaces on the turn portions, further raising thermal conductivity from the coil end group to the liquid coolant.

What is claimed is:

1. An automotive alternator comprising:

a stator having a stator core formed with slots extending axially at a predetermined pitch in a circumferential direction and a stator winding installed in said stator core;

a rotor rotatably disposed on an inner circumferential side of said stator; and a bracket for supporting said stator and said rotor, wherein a coil end group of said stator winding is constructed such that coil ends folded back outside said slots at an end surface of said stator core are arranged circumferentially, wherein a predetermined region of outer surfaces of said coil ends in a radial direction of said stator core forms a continuous circumferentially-smooth heat-conducting surface, said outer surfaces facing radially outwards from said stator core and extending from a vicinity of said end surface of said stator core to apex portions of said coil ends, and wherein a distribution channel for a liquid coolant is disposed for absorbing heat generated in said stator and conducted from said heat-conducting surface.

2. The automotive alternator according to claim 1 wherein said distribution channel is formed inside said bracket, a thermally-conductive resin being filled between said coil end group and said bracket in a state of general contact with said heat-conducting surface.

3. The automotive alternator according to claim 1 wherein said distribution channel is constituted by a tube composed of a thermally-conductive material, a portion of said tube being disposed in a state of general contact with said heat-conducting surface of said coil end group.

4. An automotive alternator comprising:

a stator having a stator core formed with slots extending axially at a predetermined pitch in a circumferential direction and a stator winding installed in said stator core;

a rotor rotatably disposed on an inner circumferential side of said stator; and a bracket for supporting said stator and said rotor, wherein said stator winding is provided with a plurality of winding sub-portions each constructed by installing a strand of wire at intervals of a predetermined number of slots so as to alternately occupy an inner layer and an outer layer in a slot depth direction within said slots, turn portions of said strands of wire which are folded back outside said slots at said end surface of said stator core forming said coil ends and lining up generally uniformly in a circumferential direction to constitute a coil end group, wherein a predetermined region of outer surfaces of said coil ends in a radial direction of said stator core forms a circumferentially-smooth heat-conducting surface, said outer surfaces facing radially outwards from said stator core and extending from a vicinity of said end surface of said stator core to apex portions of said coil ends, and wherein a distribution channel for liquid coolant is disposed for absorbing heat generated in said stator and conducted from said heat-conducting surface.

5. The automotive alternator according to claim 4 wherein said strand of wire is formed with a rectangular cross-sectional shape, said heat-conducting surface being constituted by a flat side surface of said strand of wire.

6. The automotive alternator according to claim 4 wherein said turn portions are disposed circumferentially so as to line up in a plurality of rows radially, radially-adjacent turn portions being in general contact with each other.

7. The automotive alternator according to claim 6 wherein said strand of wire is formed with a rectangular cross-sectional shape, said heat-conducting surface being constituted by a flat side surface of said strand of wire.

8. The automotive alternator according to claim 4 wherein said turn portions are disposed circumferentially such that intermediate portions of said turn portions are in close proximity with each other, said intermediate portions being between portions where said turn portions extend out from said slots and portions where said turn portions are folded back.

9. The automotive alternator according to claim 4 wherein a resin is filled between said turn portions such that a surface of said resin is positioned in a common plane with a surface of said strand of wire, said heat-conducting surface being constituted by a smooth surface composed of said surface of said strand of wire and said surface of said resin.

10. The automotive alternator according to claim 4 wherein said strand of wire is a continuous wire.

11. The automotive alternator according to claim 4, wherein said distribution channel is formed inside said bracket, a thermally-conductive resin being filled between said coil end group and said bracket in a state of general contact with said heat-conducting surface.

12. The automotive alternator according to claim 4, wherein said distribution channel is constituted by a tube composed of a thermally-conducting material, a portion of said tube being disposed in a state of general contact with said heat-conducting surface of said coil end group.

* * * * *